United States Patent
Earley et al.

(10) Patent No.: US 11,567,904 B2
(45) Date of Patent: Jan. 31, 2023

(54) DISTRIBUTED LEDGER SYSTEMS AND METHODS FOR IMPORTING, ACCESSING, VERIFYING, AND COMPARING DOCUMENTS

(71) Applicant: FIRST AMERICAN FINANCIAL CORPORATION, Santa Ana, CA (US)

(72) Inventors: Justin Lischak Earley, Rancho Mission Viejo, CA (US); David H. Blackman, Corona, CA (US); David Alexander Brown, Yorba Linda, CA (US)

(73) Assignee: FIRST AMERICAN FINANCIAL CORPORATION, Santa Ana, CA (US)

( * ) Notice: Subject to any disclaimer, the term of this patent is extended or adjusted under 35 U.S.C. 154(b) by 258 days.

(21) Appl. No.: 16/864,581

(22) Filed: May 1, 2020

(65) Prior Publication Data
US 2020/0349125 A1 Nov. 5, 2020

Related U.S. Application Data

(60) Provisional application No. 62/843,257, filed on May 3, 2019.

(51) Int. Cl.
*G06F 16/20* (2019.01)
*G06F 16/182* (2019.01)
*H04L 9/06* (2006.01)

(52) U.S. Cl.
CPC ........ *G06F 16/1837* (2019.01); *H04L 9/0637* (2013.01); *H04L 9/0643* (2013.01)

(58) Field of Classification Search
CPC .. H04L 9/0637; H04L 9/0643; G06F 16/1837
See application file for complete search history.

(56) References Cited

U.S. PATENT DOCUMENTS

| | | | |
|---|---|---|---|
| 7,194,426 B1 * | 3/2007 | Box | G06Q 30/0601 705/26.1 |
| 8,655,595 B1 * | 2/2014 | Green | G06Q 40/08 705/4 |

(Continued)

OTHER PUBLICATIONS

Anonymous, "Introducing OpenSig," OpenSig, Digital Signature Technology, http://opensig.net/#intro, Accessed Jul. 10, 2020 (4 pages).

*Primary Examiner* — Tarek Chbouki
(74) *Attorney, Agent, or Firm* — Sheppard, Mullin, Richter & Hampton LLP

(57) ABSTRACT

Some implementations of the disclosure are directed to a method, comprising: retrieving, using a device associated with an entity, a document from a system of record; uploading the document for storage in an off-chain system accessible by entities having access to a distributed ledger of a distributed ledger network, the entities comprising the entity; hashing, using the device, one or more fields contained in the document to generate a hash representing a unique reference to the document; generating, using the device, a message comprising a plurality of fields contained in the document and the hash; digitally signing, by the device, using a private key associated with the entity, the message to endorse the hash and the fields contained in the document; and after digitally signing the message, transmitting, by the device, the message to the distributed ledger network to store the hash and the fields in the distributed ledger.

18 Claims, 13 Drawing Sheets

(56) References Cited

U.S. PATENT DOCUMENTS

| | | | |
|---|---|---|---|
| 2006/0036548 A1* | 2/2006 | Roever | G06Q 40/04 705/51 |
| 2007/0198379 A1* | 8/2007 | Hynek | G06Q 50/16 705/35 |
| 2009/0006851 A1* | 1/2009 | Freeman | H04L 63/126 713/170 |
| 2009/0019549 A1 | 1/2009 | Reid | |
| 2019/0372779 A1* | 12/2019 | Monica | H04L 9/0877 |
| 2019/0378139 A1* | 12/2019 | Stribady | H04L 67/10 |
| 2020/0112427 A1* | 4/2020 | Nakamura | G06F 21/64 |

* cited by examiner

DISTRIBUTED LEDGER SYSTEMS AND METHODS FOR IMPORTING, ACCESSING, VERIFYING, AND COMPARING DOCUMENTS

CROSS-REFERENCE TO RELATED APPLICATIONS

The present application claims priority to U.S. Provisional Patent Application No. 62/843,257 filed on May 3, 2019, entitled "Distributed Ledger Systems and Methods for Importing, Accessing, Verifying, and Comparing Title Policies," which is incorporated herein by reference in its entirety.

DESCRIPTION OF RELATED ART

In some industries, different parties may share documents comprising important information that may be at risk of being inaccurate. For example, in the title industry, title insurers sometimes share information corresponding to previously issued title policies with other insurers in paper or digital form. As a result, insurers often agree to indemnify one another if that starter information was incorrect (either through a "treaty" indemnity arrangement, or piecemeal through individual "letters of indemnity"). Such agreements are desirable due to the high risk of inaccuracies in the shared information and the inefficiencies in current methods employed to verify such information. In such implementations, however, there is no practical way to determine the accuracy or completeness of information relied upon. Instead, industry actors may depend largely on the knowledge, skill, and ability of local employees to determine whether a starter was worthy of reliance.

In some present applications, a party comparing key elements of the two different documents is forced to use a "stare and compare" method to detect differences between the two documents. Under conventional practice, an employee comparing key elements of a "starter" document (i.e., "Schedule A" and "Schedule B" forms) is forced to use a "stare and compare" method to detect differences between two "starter" policies. Understanding these differences is a primary method of evaluating the accuracy or completeness of a starter. Relying on the accuracy of this information without verifying its accuracy may lead to the issuance of incomplete or faulty coverage to the policy holder. A solution is needed for participants to efficiently, securely, and verifiably publish and share accurate data corresponding to issued documents such as title policies.

SUMMARY

The disclosure is directed to distributed ledger systems and methods that provide applications and services for efficiently and securely recording, exchanging, accessing, verifying, and comparing documents provided by participating organizations. The documents may correspond to title policies associated with a property. Participating organizations may be title organizations. The distributed ledger system may be a mutual indemnity blockchain system.

In one embodiment, a non-transitory computer-readable medium has instructions stored thereon that, when executed by a processor, causes a system associated with an entity to perform a method comprising: retrieving a digital document from a system of record; uploading the digital document for storage in an off-chain system accessible by a plurality of entities having access to a distributed ledger of a distributed ledger network, the plurality of entities comprising the entity; hashing one or more fields contained in the digital document to generate a first hash representing a unique reference to the digital document; generating a message comprising a plurality of fields contained in the digital document and the first hash; digitally signing, using a private key associated with the entity, the message to endorse the first hash and the plurality of fields contained in the digital document; and after digitally signing the message, transmitting the message to the distributed ledger network to store the first hash and the plurality of fields in the distributed ledger. The distributed ledger may be a permissioned distributed ledger accessible by the plurality of entities.

In some implementations, the digital document comprises an address of a property, and the method further comprises: before generating the message, standardizing the property address, wherein the message comprises the property address.

In some implementations, the method further comprises: after standardizing the address, combining one or more components of the address into a string; and hashing the string to generate a second hash representing a unique reference to the property, wherein the message comprises the second hash.

In some implementations, hashing the one or more fields contained in the digital document to generate the first hash representing the unique reference to the digital document, comprises: combining one or more of a transaction ID, a local policy document ID, and a policy type identifier into a string; and generating the first hash from the string.

In some implementations, the digital document is a title policy, wherein the entity is a title organization, wherein the method further comprises: storing the title policy in the system of record.

In some implementations, transmitting the message to the distributed ledger network, comprises publishing the message to a policy message queue, wherein after the message is published, a determination is made whether the first hash has been previously recorded on the distributed ledger. In some implementations, if the first hash has been previously record on the distributed ledger, the first hash and the plurality of fields of the message are not stored in the distributed ledger.

In one embodiment, a method comprises: running, on a client device, a distributed ledger application comprising a graphical user interface for accessing and viewing a plurality of document records stored on a distributed ledger, each of the document records comprising a first hash representing a unique reference to a document image file and a plurality of fields extracted from the document image file; initiating, at the distributed ledger application, a search query for a property, the search query comprising a reference to the property; based on the search query, accessing two or more of the document records associated with the property; and generating, using the two or more of the document records that were accessed, a chronological view of document records issued for the property, the chronological view comprising one or more visual markers associated with the two or more document records and providing a visual representation of when each property record was issued, wherein when each of the visual markers is selected, the distributed ledger application is configured to present additional information stored on the distributed ledger that corresponds to the document record.

In some implementations, the method further comprises: receiving, via the graphical user interface, a selection of a first document record and a second document record of the two or more of the document records; and generate and display, at the user interface, a comparison view of the first and second document records, wherein the comparison view comprises an annotation of the first document record, and wherein the annotation is based on a difference between the first document record and the second document record.

In some implementations, the method further comprises: presenting using the first hash of a first document record of the two or more document records, a selectable link including an off-chain location of the document image file associated with the first document record.

In some implementations, the reference to the property comprises a property address, wherein the plurality of document records are a plurality of title policy records, wherein each of the document image files is a title policy image file.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 10 illustrates an embodiment of a search result for a mutual indemnity blockchain system, in accordance with the disclosure.

FIG. 11 illustrates an embodiment of policy information items in accordance with the disclosure.

Figure 1:
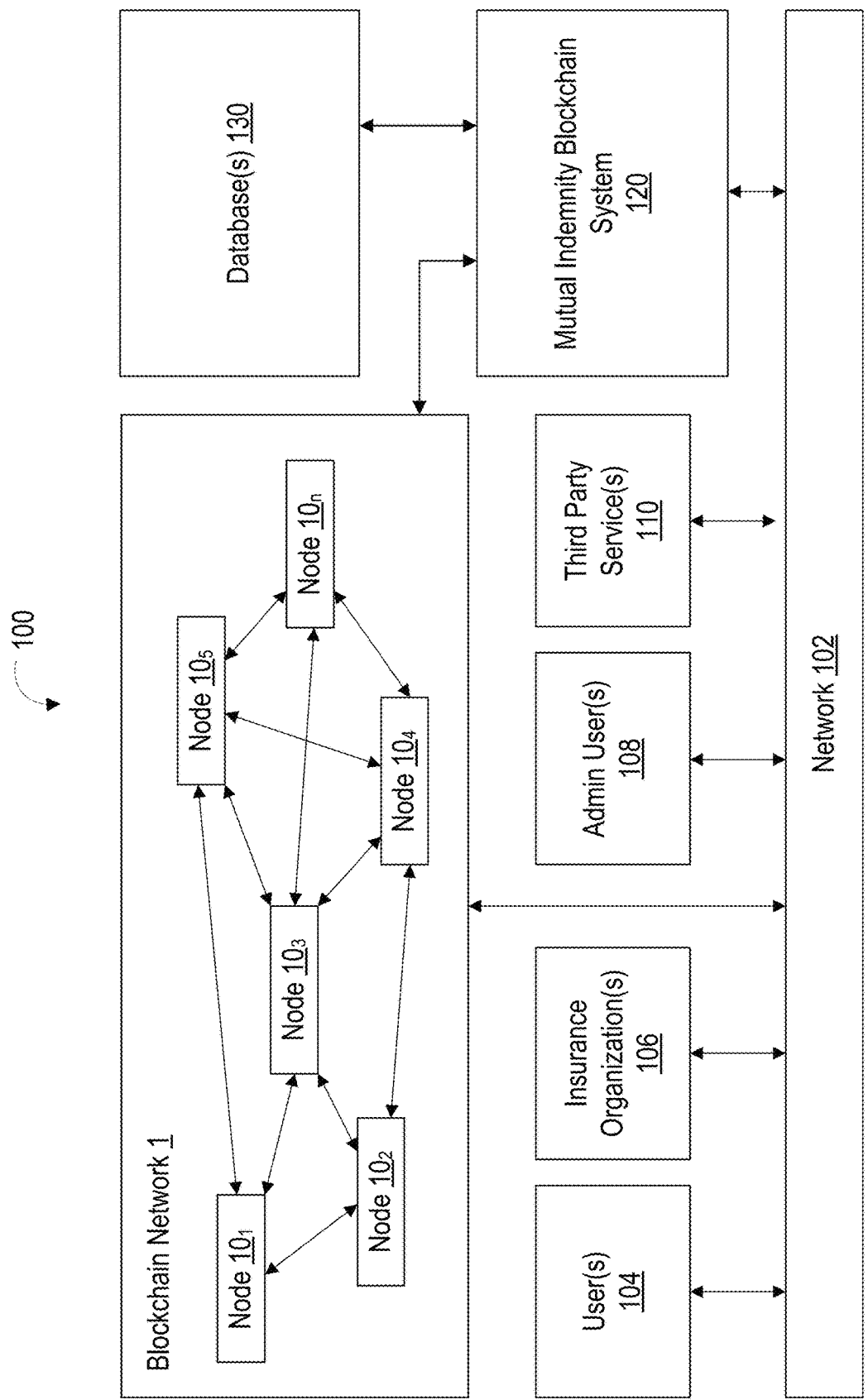
FIG. 1 illustrates a network overview of a mutual indemnity blockchain system, in accordance with the disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "distributed ledger" generally refers to a digital ledger that is shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include Kafka, proof of work, proof of stake, proof of elapsed time, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. A blockchain is sometimes referred to as a linear and single-linked Directed Acyclic Graph (DAG).

As such, while all blockchains are a form of a distributed ledger, all distributed ledgers are not necessarily a blockchain. HYPERLEDGER, BITCOIN, and ETHEREUM are examples of blockchain-based distributed ledgers. Non-linear or multiple-linked DAGs are another example of a common form of DLT. IOTA is an example of a multiple-linked DAG-based platform. Unless explicitly stated otherwise, implementations of the disclosure may apply to any variant of DLT, including blockchains, multiple-linked DAGs, etc.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger.

As used herein, the term "private" blockchain generally refers to a blockchain where a limited set of trusted entities participate in a blockchain network. A permissioned set of trusted nodes may participate in the consensus process. For example, a consortium of multiple financial institutions may form a private blockchain network. The right to read a private blockchain may be public or restricted to trusted nodes. A private blockchain may be referred to as a permissioned blockchain.

As used herein, the term "smart contract" generally refers to self-executing code residing on a distributed ledger network. In some implementations a smart contract may be configured to automate the execution of contractual agreements between trusted parties based on events that occur on a distributed ledger.

Some implementations of the disclosure are directed to distributed ledger systems and methods that provide applications and services for efficiently and securely recording, exchanging, accessing, verifying, and comparing documents provided by participating organizations.

In implementations, asymmetric-key cryptography may enable one or more participating organizations (e.g., title insurers) to verify information corresponding to policies on a permissioned, shared, and interoperative ledger. In implementations, the system enables third parties to verify the accuracy, completeness, and validity of "paperless policies" issued using the ledger.

Using state-of-the-art hashing algorithms, the system may create a digital fingerprint of critical decisioning data and an electronic copy of issued policies. In embodiments, the system may sort and organize policies as digital assets (i.e., a "colored coin") created to represent identifiable pieces of real property stored in the system. In implementations, transactions on the ledger may create an immutable link between the information stored or published, the policies issued to one or more policy holders, and the participants who publish the information.

In implementations, the process of publishing and recording information corresponding to title policies may be automated. Each participant in the shared ledger may generate asymmetric-key PKI credentials which it may use to digitally-sign each information item that it publishes or records to the shared ledger. The system may organize each information item onto a "colored coin" that represents the status of title to a particular, unique parcel of real property. In implementations, each participant may trust the public key infrastructure (PKI) credentials generated by each other participant, whether directly (root or mesh trust) or through an industry bridge certification authority, because certain actions occurring (i.e., publishing information) may require the private key of an authenticated participant.

In implementations, participants may be able to verify that an information item representing a particular parcel of land or a policy was digitally-signed by a counterparty in the shared ledger. In implementations, trust that a counterparty performed accurate work in examining the title to may be established through one or more mutual-indemnity agreements that require each participant to verify the accuracy of its work. Accordingly, the counterparty will not need to "go behind" or verify its counterparty's digitally-signed work, and instead will only "come forward" from the counterparty's work as represented by the colored coin. Errors in the counterparty's work in creating/updating a "colored coin" may be addressed by a mutual indemnity agreement between the counterparties. In implementations, a mutual indemnity agreement may be represented by a smart contract.

Further, a user can be provided with a unique, chronological view of the status of title for individual policies or properties. The present disclosure enables users to easily explore the range of information items corresponding to policies.

An additional benefit of implementations herein is the ability to issue "paperless policies" to customers, which paperless policies can be verified as in force, complete, and unaltered at any time by utilizing the underwriter's public key. This may assist customers, courts, regulators, and others who are presently bound to paper policies that can be subject to advertent or inadvertent tampering and thus difficult to verify.

In embodiments, the present system enables an issuing organization to provide a replacement policy, or to "flag" a flawed policy to indicate that it not recommended to be used as a starter policy. This further reduces the use of potential faulty coverages for future policies.

In embodiments, the system may be able to compare the information of two or more policies, chosen by the user, and provide a redline comparison illustrating the differences. This method improves upon the inefficient "stare and compare" operation required under pre-invention practice, vastly increasing the speed and accuracy of such comparisons. Under pre-invention practice, the tedious nature of the manual comparison meant that such a comparison was not always performed with the frequency, accuracy, and completeness desired. The present system provides the opportunity to perform this comparison in a more comprehensive, uniform manner providing more consistency and quality to policies issued going forward.

FIG. 1 illustrates an example of a system 100 configured to securely manage a system for verifiably recording, and exchanging title policy transactions, in accordance with one or more implementations of the disclosure. System 100 may include a blockchain network 1 composed of multiple nodes 10 (e.g., node 101, node 102, . . . , and/or node 10$n$), one or more databases 130, one or more users 104, one or more insurance organizations 106, one or more administrative users 108, one or more third party service providers 110, a mutual indemnity blockchain system 120, and/or one or more other components. Each node 10 may include a processor and/or memory or data storage (not shown).

The mutual indemnity blockchain system 120 may be configured to verifiably manage the recording and exchange of title policies. Particularly, a mutual indemnity blockchain system may be configured to create and manage one or more digital assets representing one or more title policies associated with an identifiable parcel of real property.

In various implementations, information related to title policies via the mutual indemnity blockchain system (e.g., mutual indemnity blockchain system 120) may be stored in one or more databases 130. For example, information pertaining to or identifying title policies, participants to the mutual indemnity blockchain system, and parcels of property may be recorded to one or more databases 130. In some implementations, information pertaining to the creation, transfer, verification, or modification of a title policy may also be recorded to a blockchain, thereby creating an immutable record. In some implementations, digital images of physical copies of title policies may be stored in one or more databases 130 in association with a one or more digital identifications.

The one or more databases 130 may comprise a set of databases configured to store information related to title policies via the mutual indemnity blockchain system 120. The one or more databases 130 may comprise one or more databases as shown as and described herein. In various implementations, the mutual indemnity blockchain system 120 described herein may be configured to write transaction data to one or more transaction databases of one or more databases 130 and record information in one or more other databases of one or more databases 130. In various implementations, transaction data may be written to a blockchain or a distributed ledger in addition to, or instead of, being written to the one or more transaction databases of one or more databases 130. The components of system 100 may be in communication with one another via a network 102. As used herein, for convenience, mutual indemnity blockchain system 120 will be described as communicating with or otherwise exchanging information with one or more users 104, one or more insurance organizations 106, one or more administrative users 108, one or more third party services 110, and/or one or more additional third parties, when, in fact, mutual indemnity blockchain system 120 communicates with or otherwise exchanges information with one or more users 104, one or more insurance organizations 106, one or more administrative users 108, one or more third party services 110, and/or one or more additional third party services connected to mutual indemnity blockchain system 120 via network 102. As used herein, a "transaction" does not necessarily refer to a financial transaction occurring on one or more blockchain networks, but rather may refer to a change in the state of one or more blockchains or an update or modification to one or more distributed ledgers. For example, a transaction may include, but is not limited to, the recordation or publication of information items pertaining to a title policy, the modification of information items pertaining to a title policy, the transfer of title of an identified parcel of property, the association of a title policy with one or more parcels of property, or any other action performed by a participant of the system as described herein.

The multiple nodes 10 of blockchain network 1 may comprise a set of peers to which a decentralized distributed ledger is distributed. This ledger is said to be "decentralized" because it is replicated across the many network participants/peer (e.g., multiple nodes 10), each of whom may collaborate and/or cooperate in its maintenance. Transactions committed to a decentralized ledger may comprise verified transactions. In blockchain implementations, a "block" is a part of a blockchain, in which some or all of the recent transactions may be recorded. Once completed, a block is stored in the blockchain. Each block in the blockchain is cryptographically connected to the others (like links in a chain) in proper linear, chronological order. Every block contains a cryptographic hash of the previous block. As a result, the blockchain may comprise information about different user addresses and their associated policies or property from the genesis block to the most recently completed block.

In addition to being decentralized and collaborative, the information recorded to the distributed ledger described herein may be "append-only", using cryptographic techniques that guarantee that once a transaction has been added to the ledger it cannot be modified. This property of "immutability" makes it simple to determine the provenance of information because participants can be sure information has not been changed after the fact. As described further herein, each transaction to be recorded to a blockchain may be validated and authenticated by the nodes of the network (e.g., multiple nodes 10) via a consensus process. Consensus may serve to confirm the correctness of all transactions in a proposed block (according to endorsement and consensus policies/protocols) and ensure the network participants or nodes agree on order and correctness (which implies an agreement among the nodes on a global state).

In some implementations, the systems, methods, and non-transitory computer readable media described herein may be configured to implement a blockchain-based mutual indemnity system (i.e., mutual indemnity blockchain system 120) via a private and permissioned distributed ledger architecture. Rather than an open permission-less system that allows unknown identities to participate in the network (requiring protocols like "proof of work" to validate transactions and secure the network), the members of the distributed ledger network may enroll through a trusted membership service provider, whereby the identification of participants to the network may readily be established and inspected. Further, all transactions occurring on a network may be associated with one or more identified participants.

In some instances, the HYPERLEDGER FABRIC may be utilized. HYPERLEDGER FABRIC is a private and permissioned, wholly contained blockchain environment that consists of a number of distinct, though related, parts. A HYPERLEDGER FABRIC may comprise components including nodes, consensus, and virtual machines. The network within HYPERLEDGER may be referred to as a "channel" which all components in the solution interface with. HYPERLEDGER has a ledger, may use smart contracts (called "Chaincode" in HYPERLEDGER), and may be a system by which participants manage their transactions.

In various implementations, the distributed ledger architecture used to implement the blockchain-based mutual indemnity system described herein may enable ledger data to be stored in multiple formats, consensus mechanisms to be swapped in and out, and support multiple different membership service providers. For instance, via a HYPERLEDGER FABRIC, channels may be created through which one or more participants (e.g., multiple nodes 10 and/or users 104 of mutual indemnity blockchain system 120) may create a separate ledger of transactions. In an exemplary implementation in which multiple insurance organizations 106 interact with mutual indemnity blockchain system 120, individual sets of one or more users 104, insurance organizations 106, admin users 108, and third party services 110 may form a channel. In embodiments, access to the ledger corresponding to a particular channel may be made available to one or more participants based on their respective permissions. In implementations, the level of access to a ledger may depend on permissions associated with one or more participants. For example, some participants may be authorized by the network to read transactions, but not to write transactions to a ledger, while others may be authorized to write transactions to a ledger.

In various implementations, transactions may be written to the ledger in the order in which they occur, even though the transactions might be between different sets of participants within the network. To ensure transactions are written to the ledger in the order in which they occur, an order of transactions may be established and a method for rejecting false transactions that have been inserted into the ledger in error (or maliciously) may be put into place. In various implementations, the distributed ledger architecture used to implement the blockchain-based mutual indemnity system described herein may enable administrative users (e.g., one or more administrative users 108) to choose a consensus mechanism that best represents the relationships that exist between participants.

Figure 2:
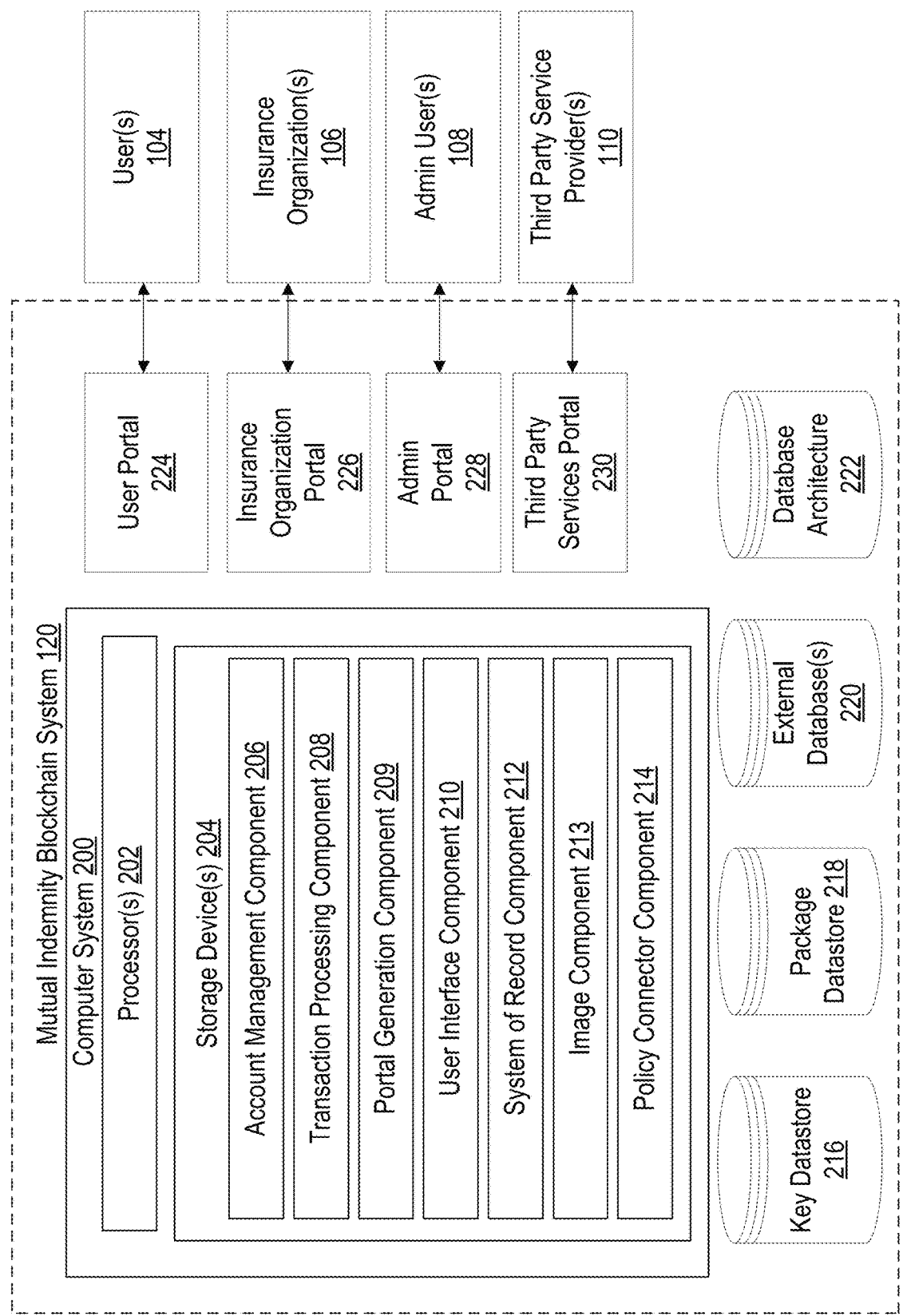
FIG. 2 illustrates a component overview of a mutual indemnity blockchain system, in accordance with the disclosure.

FIG. 2 illustrates a block diagram of an example of a mutual indemnity blockchain system 120, in accordance with one or more implementations of the disclosure. Mutual indemnity blockchain system 120 may include a computer system 200 and one or more portals generated by computer system 200. The one or more portals generated by computer system 200 may include a user portal 224, an insurance organization portal 226, an admin portal 228, a third party services portal 230, and/or one or more additional portals. As described further herein, the one or more portals generated by computer system 200 may be configured to interface with participants of mutual indemnity blockchain system 120. For example, the one or more portals may be specifically configured to interface with one or more users 104, one or more insurance organizations 106, one or more administrative users 108, and/or one or more third party services.

Computer system 200 may be configured as one or more computers or processing resources. Computer system 200 may further be configured as a blockchain network and/or cloud-based system. Computer system 200 may include one or more physical processor(s) 202, one or more storage devices 204, and/or other components. Processor(s) 202 may be configured to provide information processing capabilities in computer system 200. As such, processor(s) 202 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Operating as a cloud-based system, one or more processor(s) 202 of computer system 200 may be included in a plurality of server platforms and may cooperate to perform the functions that implement and/or instantiate computer system 200. Similarly, one or more storage devices of computer system 200 (e.g., one or more storage devices 204) may be distributed across multiple physical platforms, and cooperate to provide the required storage space. Computer system 200 may therefore operate as a virtualized system.

Processor(s) 202 may be programmed by one or more computer program instructions stored in one or more storage devices 204. For example, processor(s) 202 may be programmed by an account management component 206, a transaction processing component 208, a user interface component 210, a system of record component 212, a standardization component 212, a policy connector component 214, and/or other instructions that program computer system 200 to perform various operations, each of which are described in greater detail herein.

In embodiments, account management component 206 may be configured to generate and manage digital accounts configured specifically for users, insurance organizations, administrative users, third party service providers, and/or other users of a mutual indemnity blockchain system as described further herein. Portal generation component 209 may be configured to generate and provide portals for accessing a mutual indemnity blockchain system, as described further herein. For example, portal generation component 209 may be configured to generate and provide a user portal 224 for interfacing with one or more users 104, an insurance organization portal 226 for interfacing with one or more insurance organizations 106, an admin portal 228 for interfacing with one or more administrative users 108, a third party services portal 230, and/or one or more other portals. As used herein, for convenience, various instructions will be described as performing an operation, when, in fact, the various instructions program the one or more processor(s) 202 (and therefore computer system 200) to perform the operation.

In various implementations, various features described herein as being performed by account management component 206, transaction processing component 208, portal generation component 209, user interface component 210, system of record component 212, image component 213, and/or policy import component may be performed by executing computer readable instructions. The instructions may comprise one or more blockchain-based smart contracts. As used herein, a "smart contract" may refer to computer code configured to be executed on a blockchain network. The code contained therein may exist across a distributed, decentralized blockchain network. Using a scripting language or other techniques, a smart contract can include logic-based programs run on top of a blockchain. One or more of the features described herein may be executed based on blockchain-based smart contracts stored in a smart contract repository. For example, one or more participants to the system 120 may engage in mutual indemnity agreements using one or more smart contracts comprising at least a smart contract identification, party information, and one or more conditions.

Account management component 206 may be configured to generate and manage digital accounts and/or digital accounts configured specifically for user, insurance organizations, administrators, third party services, and/or other participants of mutual indemnity blockchain system 120.

Transaction processing component 208 may be configured to facilitate the transfer, exchange, and modification of title insurance-related information or digital assets. In some implementations, transaction processing component 208 may be configured to facilitate transfer, exchange, and modification of title insurance-related information or other digital assets to be linked to a digital account. For example, a participant to the system, such as an insurance organization, may have an account on the system that may be digitally linked to one or more information items that the organization published to the network. In some implementations, transaction processing component 208 may be configured to identify one or more insurance organizations through which one or more title policies linked to a digital account may be recorded. Further, transaction processing component 208 may be configured to identify one or more parcels of real property to which one or more title policies may be linked.

Portal generation component 209 may be configured to generate and provide portals for accessing mutual indemnity blockchain system 120. Each portal generated by portal generation component 209 may be provided via a user interface of a user device associated with one or more users, insurance organizations, administrative users, third party services, and/or other users of mutual indemnity blockchain system 120. In embodiments, users 104 may be home owners, home purchasers, lenders, insurance organizations, or one or more parties to an insurance contract, etc. In various implementations, portal generation component 209 may be configured to generate user portal 224, insurance organization portal 226, admin portal 228, third party services portal 230, and/or one or more other portals.

Storage devices 204 of mutual indemnity blockchain system 120 may include a key datastore 216, a package datastore 218, an external database 220, a database architecture 222, and/or one or more other electronic storage components. Key datastore 216 may be configured to store and manage public keys and private keys for digital accounts of mutual indemnity blockchain system 120. For example, key datastore 216 may be configured to store, for each digital account of mutual indemnity blockchain system 120, a public key, a corresponding private key, and an indication of the association between the public key and the corresponding private key. Each key may comprise a long string of numbers and/or letters. In some implementations, public keys and private keys may comprise long strings of numbers and/or letters linked through a cryptographic algorithm that was used to create the keys. A private key may be held in secret by each account (or user associated with an account), while the public key may be publicly available and used to identify the corresponding account.

In some implementations, public keys may be administered via a public key infrastructure (PKI) comprising a set of roles, policies, and procedures needed to create, manage, distribute, use, store, and revoke digital certificates and manage public-key encryption. Package datastore 218 may be configured to store and manage pre-defined title policy information comprising data structures that define package parameters and an associated list of insurance organizations participating in mutual indemnity blockchain system 120.

One or more external databases 220 may be configured to store information contained in one or more storage devices of mutual indemnity blockchain system 120 separately from a decentralized ledger. In implementations, external database 220 may comprise a cloud storage service, such as Azure Blob. In other embodiments, external database 220 may comprise a peer-to-peer distributed file storage system such as the Inter Planetary File System (IPFS). In some embodiments, external database 220 may be configured to store copies of title policies. In implementations, title policies may be stored in PDF form. However, other suitable file formats are possible, including but not limited to, TIFF, JPEG, BMP, RAW, TGA, EXIF, PNG and PNM.

Figure 3:
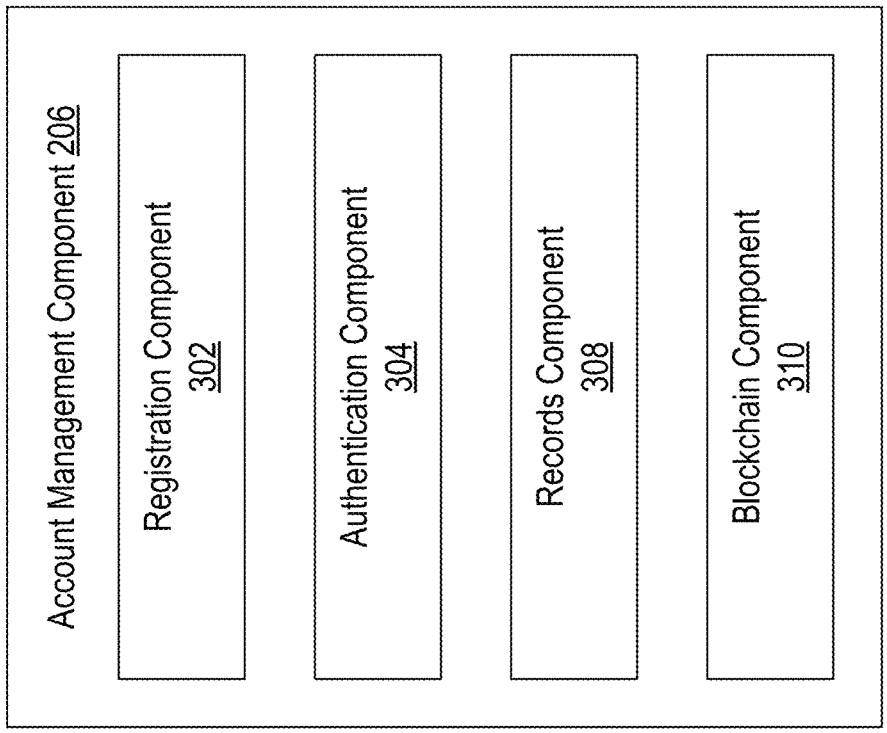
FIG. 3 illustrates an overview of an account management component, in accordance with the disclosure.

FIG. 3 illustrates a block diagram of an example of an account management component 206 configured to generate and manage digital assets for users of a mutual indemnification blockchain system 120, in accordance with one or more implementations of the disclosure. In various implementations, functionality of account management component 206 may be performed by one or more servers, workstations, desktop computers, laptop computers, mobile devices, and/or other computing devices. In some implementations, functionality of account management component 206 may be performed by computing system 200. For example, the components of account management component 206 may comprise computer-readable instructions executable by processors 202. The components of account management component 206 may comprise registration component 302, authentication component 304, records component 308, blockchain component 310, and/or other computer program components. As used herein, for convenience, the various components of account management component 206 will be described as performing an operation, when, in fact, the various components comprise instructions which may program the processors 202 (and therefore computing system 200) to perform the operation.

Registration component 302 may be configured to register one or more users with mutual indemnification blockchain system 120 and generate a digital account for registered user, including at least users 104, insurance organizations 106, administrative users 108, and third party service providers 110. In various implementations, registration component 302 may be configured to register a user with mutual indemnification blockchain system 120 by creating a user account for the user. For example, registration component 302 may be configured to obtain user information for a user and create a user account for that user that includes the obtained user information. User information may include identifying information (e.g., a first name, a last name, a social security number, a photo of the user or to be associated with the account, an institution name, a tax identification number, a business identification, a lender identification, and/or other identifying information), contact information (e.g., a mailing address, an email address, a phone number, and/or other contact information), financial information (e.g., bank account information, credit card information, and/or other financial information), information indicating a user type (e.g., insurance organization, administrator, lender, home owner, or third party service provider), information indicating one or more permissions to be associated with a user account of the user, and/or other information that may be associated with, or used to create, a user account.

In various implementations, registration component 302 may be configured to create and/or update a user account responsive to user input. For example, a user account for a user may be created and/or updated based on a user input communicating user information. In some implementations, registration component 302 may be configured to create and/or update a user account responsive to user input received via a graphical user interface of one or more user devices. In some implementations, registration component 302 may be configured to create and/or update a user account automatically based on information accessible to mutual indemnification blockchain system 120. In various implementations, registration component 302 may be configured to store user accounts in a client repository and/or member database.

In various implementations, transactions within mutual indemnification blockchain system 120 involving at least one user's digital account generated by registration component 302 may be authorized by the user with the private key for the account. The transaction itself may be encrypted using the user's private key. In implementations, only the public key associated with a particular private key may be used to decrypt data encrypted with that private key. Each transaction may identify the public keys of the digital accounts involved in the transaction and additional information defining the transaction (e.g., the identifying information of the title policy, the identification of a parcel of property, encumbrances associated with an identified title). The transaction may be verified by blockchain network 1 using at least the private key of one digital account involved in the transaction to verify that the user associated with that digital account did indeed authorize that transaction.

In various implementations, registration component 302 may be configured to generate an account for a user based on information indicating a user type associated with the user. For example, information indicating a user type associated with a user may indicate that the user is a home owner, a lender, an insurance organization, an administrative user, a trusted third party service provider, and/or other user type. In some implementations, registration component 302 may be configured to generate a unique digital account for a user that is configured specifically for the type of the user. In some implementations, each digital account may be configured with specific functionality. In some implementations, each digital account may be configured with specific permissions.

In various implementations, registration component 302 may be configured to generate a digital account for a user based user input received via an web-based interface, a mobile application, and/or one or more other applications or interfaces configured to receive user input related to mutual indemnification blockchain system 120. In various implementations, registration component 302 may be configured to cause a digital account application to be downloaded in response to the registration of a user and/or the generation of a digital account for the user. For example, registration component 302 may be configured to cause a prompt to be provided to the user via an interface of one or more user devices of the user, wherein selection of a selectable component presented with the prompt causes the user device to download the digital account application. A user device may comprise a personal computer (e.g., a desktop computer, a laptop computer, etc.), a smartphone, a tablet computing device, and/or other device for which the digital account application is compatible. In various implementations, various functionality described herein may be enabled, and information to be presented may be provided, through the digital account application.

Authentication component 304 may be configured to manage and/or authenticate the authentication of users accessing mutual indemnification blockchain system 120. For example, the identity of users accessing mutual indemnification blockchain system 120 may be confirmed utilizing multifactor or multi-signature authentication. In various implementations, authentication component 304 may be configured to manage one or more authentication factors. The one or more authentication factors may include provision of a PIN, SMS verification, QR code authentication, fingerprint analysis, and/or one or more other authentication factors. In various implementations, authentication component 304 may be configured to authenticate the identity of a user attempting to access (e.g., sign-in to) a digital account using one or more authentication factors. In some implementations, certain functionality or information may be associated with additional security protocols. For example, an administrative user may indicate that one or more types of transactions or certain information to be displayed by mutual indemnification blockchain system 120 require authentication of a user identity using one or more authentication factors. In some implementations, a digital account application of mutual indemnification blockchain system 120 may interface with one or more components of a user device associated with a user to verify the identity of the user (e.g., to perform a multifactor identity authentication). For example, a digital account application of mutual indemnification blockchain system 120 may access one or more hardware components of a user device (e.g., a camera, a fingerprint sensor, a microphone, and/or one or more other hardware components) to verify the identity of a user.

Records component 308 may be configured to manage a transaction history of a user stored in association with a user account and/or linked to a digital account of the user. For example, a transaction history of a user may include title policy records (e.g., a history of title policies that have been recorded and/or changes to title policies). In various implementations, records component 308 may be configured to display via an interface title policy records of a user stored in association with a user account and/or linked to a digital account of the user or a digital identifiable parcel of real property. For example, records component 308 may be configured to enable a user to manage title policies of the user through a user interface.

In various implementations, records component 308 may be configured to facilitate access to one or more title policy records of a user linked to a digital account of the user by one or more other users and/or third parties. For example, records component 308 may be configured to facilitate access to one or more title policy records of a user by one or more insurance organizations, trust third party service providers, lenders, home owners, or members of the public. In various implementations, title policies linked to a digital account of a user may comprise permissioned information that may only be accessed by the user and one or more other users and/or third parties which the user has permitted access. In some implementations, records component 308 may be configured to facilitate access to one or more title policy records of a user by one or more other users and/or third parties in response to user input by the user specifying the one or more other users and/or third parties. In some implementations, records component 308 may be configured to facilitate access to one or more records of a user by one or more other users and/or third parties in response an indication that access to the records has been provided to the one or more other users and/or third parties. For example, an indication that access to the records has been provided to one or more other users and/or third parties may include an indication that a password associated with the records of the user has been entered by the one or more other users and/or third parties (or via an interface of a user device associated with the one or more other users and/or third parties), an indication that a QR code associated with the records of the user has been scanned by the one or more other users and/or third parties (i.e., by a user device associated with the one or more other users and/or third parties), an indication that a QR code associated with the one or more other users and/or third parties has been scanned by a user device of the user, and/or one or more other indications intended to represent consent by the user to grant access to the records by the one or more other users and/or third parties. When access to records of a user has been provided to one or more other users and/or third parties the one or more other users and/or third parties may access and view the records of the user via one or more portals specifically configured for the one or more other users and/or third parties (e.g., user portal 224).

In some implementations, records component 308 may be configured to update records of a user linked to a digital account of the user. In some implementations, records component 308 may be configured to update records of a user linked to a digital account of the user based on user input received from the user. For example, a user may access records via a digital account application to update one or more specific title policy or real property-related information items or criteria.

Blockchain component 310 may be configured to interface with a blockchain network or a decentralized ledger. In various implementations, blockchain component 310 may be configured to generate transactions to be transmitted to a blockchain network (e.g., blockchain network 1). In some implementations, blockchain component 310 may be configured to generate transactions for each interaction with a digital account facilitated by account management component 206. For example, blockchain component 310 may be configured to generate transactions when a digital account of a user is generated. Blockchain component 310 may also be configured to generate transaction(s) for each acquisition, transfer, or modification of a title policy. In various implementations, blockchain component 310 may be configured to write each transaction generated as a block to the decentralized ledger. In this manner, an immutable record of each digital account and each interaction with the digital account may be recorded in a decentralized ledger.

As described herein, one or more participants may access, read, or write to one or more distributed ledgers contained within system 120. In implementations, participants may interact with the system through a web interface (i.e. a portal) configured to interact with a blockchain environment. For example, MetaMask or another dApp browser bridge may be used by one or more users or administrators of the system to access the functionality or features of one or more distributed ledger features of the system.

Figure 4:
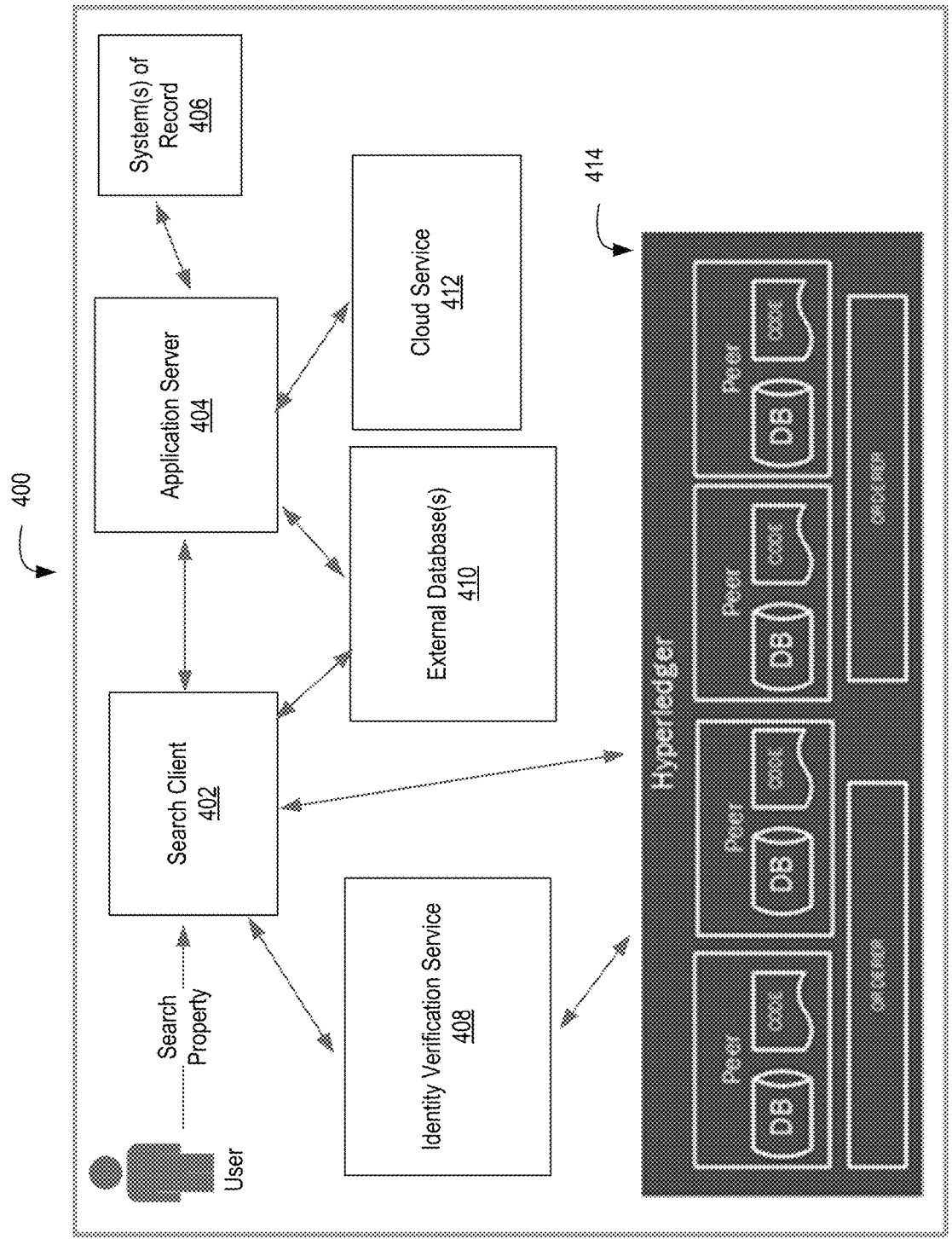
FIG. 4 illustrates a system architecture overview of a mutual indemnity blockchain system, in accordance with the disclosure.

FIG. 4 illustrates a high-level overview of an example system architecture 400 of system 120. System architecture 400 may comprise a set of databases, services, systems, or other components configured to store information and/or transactions required to securely manage the recordation, verification, standardization, transfer, and processing of title policies via a blockchain-based mutual indemnification system (e.g., mutual indemnity blockchain system 120). In some implementations, the system architecture may comprise a database architecture the same as or similar to the one described herein with respect to FIG. 2.

In embodiments, the system architecture 400 may comprise a search client 402 accessible by a user. Search client 402 may be configured to search for information items corresponding to issued title policies recorded within a distributed ledger service 414. In implementations, HYPERLEDGER may be implemented in the system architecture 400 for recording and querying information items corresponding to issued title policies. In embodiments, search client 402 may comprise an application programming interface to facilitate in the interaction between search client 402, identity verification service 408, application server 404, external databases 410, and the distributed ledger service 414. Search client 402 may be configured to search through the distributed ledger service 414, an external database 410, a cloud service 412, and/or a system of record 406.

In implementations, identity verification service 408 may be configured to verify and authenticate the identity of a user using search client 402. For example, identity verification service 408 may be configured to verify that user is authorized to access the distributed ledger service 414.

In embodiments, the system architecture 400 may comprise an application server 404. Application server 404 may be a software framework that facilitates the operation of a web interface for hosting the search client. In specific implementations, the application server 404 may provide an environment for search client 402 to perform searches. In implementations, the application server may be configured to upload, retrieve, publish, and access information contained within a system of record 406.

In implementations, one or more external databases 410 and cloud services 412 may be used to store information corresponding to title policies. External databases 410 and cloud services 412 be may configured to store information and/or images associated with title policies that are immutably stored by the distributed ledger service 414. In implementations, external databases 410 and cloud services 412 be may configured to store information and/or images containing unique identifications associated with hashes recorded on distributed ledger service 414. In embodiments, the one or more external databases may be referenced by or associated with policies recorded by distributed ledger service 414 (e.g., using the hashes).

Figure 5:
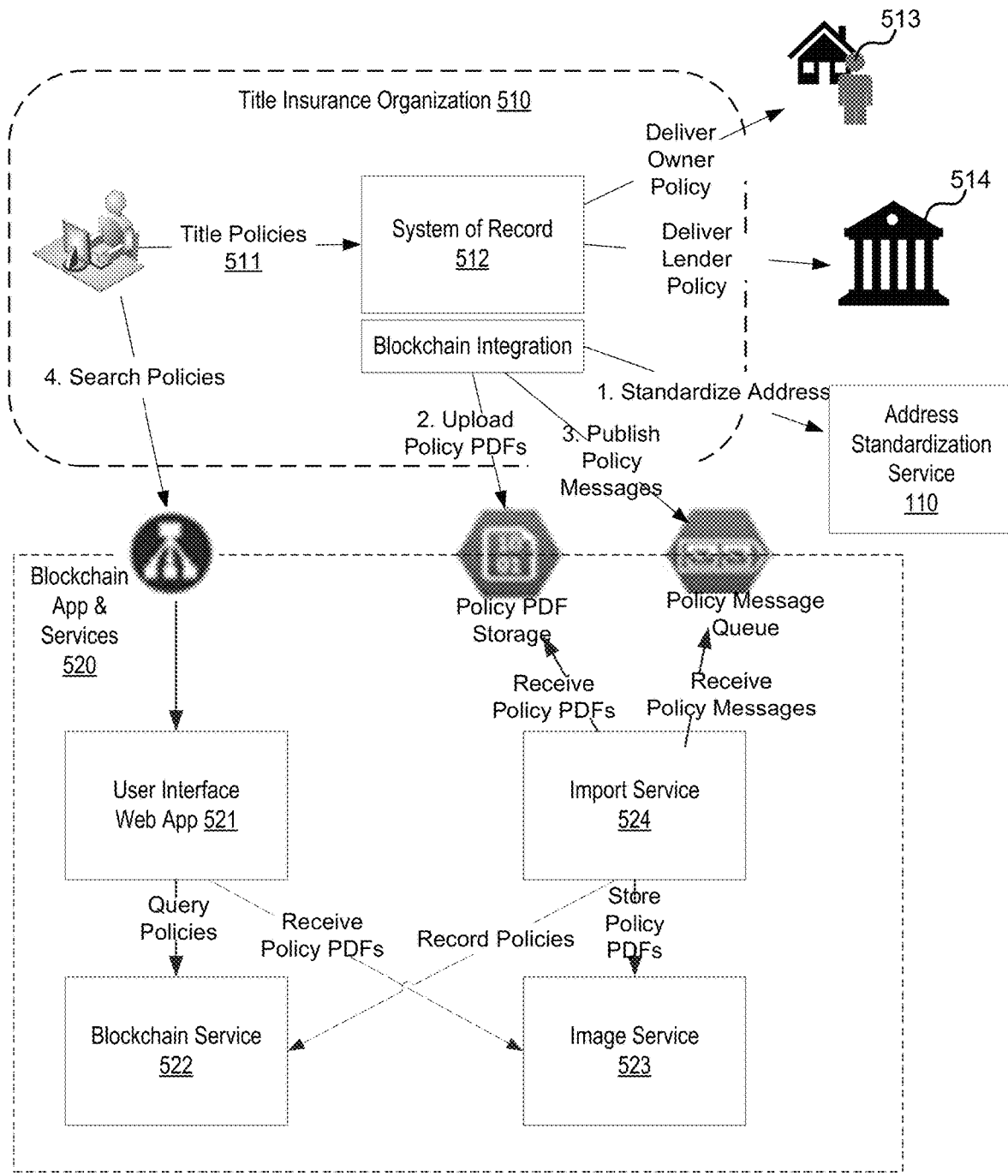
FIG. 5 illustrates an embodiment of a mutual indemnity blockchain system, in accordance with the disclosure.

FIG. 5 illustrates an embodiment of the mutual indemnity blockchain system 120. As illustrated, a title organization 510 within the system may issue title policies that are stored in a local system of record 512 of the organization 510. The issued title policies may be delivered to real estate owners and/or lenders.

In this example, the title organization also hosts an application that provides for mutual indemnity blockchain services as described herein. Particularly, in preparation for ingesting title policies for use by the mutual indemnity blockchain system, the organization may be configured to standardize the property addresses contained in issued title policies using address standardization service 108. By virtue of such standardization, mutual indemnity blockchain application may consistently and uniquely identify properties associated with a standardized address. For example, when a standardized property address and/or other data from a title policy is hashed, the same result may be consistently generated within the organization or across organizations that use the same standardization (e.g., for the purpose of creating a property ID as discussed below).

Following standardization, title policy data may be ingested from the system of record 512 into the mutual indemnity blockchain application and associated services 520. Title policy data may then be published to the system in the form of a message that is imported via import service 524. The message may be digitally signed using a private key associated with title insurance organization 510, the digital signature providing an endorsement of title policy data contained therein. A public key corresponding to the private key may be used by other organizations or users to verify that the title policy data was endorsed by the title insurance organization 510. An image of the title policy (e.g., PDF) is also be imported via import service 524 in associated with the title policy message. The image is stored by the system in image service 523, which may be an off-chain service. As further discussed below, information contained within the title policy document/image, whether as discrete information items or as files, may be hashed to create a unique document identifier (ID), which may be stored/recorded on a blockchain ledger (e.g., blockchain service 522). Thus, information contained with individual title policies may be cryptographically associated with those policies on the blockchain ledger.

In implementations, a user can search for one or more title policies by accessing the blockchain application through a web or cloud-based application 521 that retrieves policy information from the blockchain service 522 and/or image service 523. In embodiments, title insurance organizations or other organizations may make available applications, web servers, or search engines for users to query policies and information items associated with those policies.

Transactions performed on the blockchain may create state changes that are recorded on one or more distributed ledgers. The term "action" as used herein refers to an action performed by a person or organization that results in a state change. Participants may be any organization, person or group of persons, or entity that may access or perform transactions on the system. In certain embodiments, a participant may be program or coded instructions configured to access or perform transactions on the system.

In the industry of title insurance, insurance providers, such as insurance organizations 106, may share information pertaining to a policy, including at least one or more persons, values, or one or more real property assets. In some cases, this information may be derived from previously issued policies. However, if such information is inaccurate or invalid, there is an increased risk of a future dispute between actors that may rely on the accuracy of the policy.

A participant of the system, such as an insurance organization, may collect information pertaining to an title policy. The information may be standardized or recorded according to a set of one or more rules to create data sharing efficiencies with other participants. Standardized addresses can help ensure addresses of properties can be recorded in a standard and consistent way so that all policies issued on the same property, even by different title organizations, can be grouped together for searching and comparing over timeline of history. In implementations, information is unable to be recorded by the system unless it complies with certain formats.

For example, policies may be recorded and identified according to a unique identification and other relevant information. In implementations, a policy may be uniquely identified by the system by a policy ID. A policy ID may be SHA256 hash value computed from a string according to a prescribed format. In embodiments, the string may be formed from at least the identification of the party type or policy kingdom (i.e. owner or lender); an internal document identification number following format; or a transaction ID. In implementations, the hash value formed from the string may be compared other policy IDs to determine the existence of duplicates. In certain embodiments, policies may be queued to determine if they are the same as existing policies or new versions of existing policies. In a specific implementation, a SHA256 hash value may be computed to identify a policy from a string in the following format: [Policy Kingdom]+[Transaction ID]+[Policy Document ID]. For example, a string formed from the input ["Owner"]+[41865257]+[826821460] may result in a unique hash value of 6C5B107803A5756B3DDB7CD766A9CA1494E82E39746CD5C3F152FB7E41872B9E.

In implementations, real property assets may be identified by a property ID. In some embodiments, a property ID may be a SHA256 hash value computed from a string in a certain format. In some embodiments, the string may be formed from the address of the property or other identifying characteristics. In embodiments, the property ID may be based on a tax identification, a geographic location, GPS coordinate, or a geofence. Policies issued by one or more participants on the system may be associated with one or more property IDs. In a specific implementation, a SHA256 hash value may be computed to identify a parcel of property from a string in the following format: [AddressLine1]+[AddressLine2]+[City]+[County]+[State]+[Zip]. For example, a string formed from the input [246 W JAMISON CT]+[LITTLETON]+[ARAPAHOE]+[CO]+[80120] may result in a unique hash value of 604350eae9047a138fb5f5806f09db474ea4.

In implementations, real property may be represented by a so called "colored coin." For example, a digital asset may represent the status of title to a particular unique parcel of real property. Changes in information corresponding to the status of the property may update the "colored coin" immutably so that participants can monitor the status of uniquely identified digital assets corresponding to real property. In implementations, information corresponding to particular real property parcels may also be in the form of a digital asset. For example, a parcel of real property may be encumbered by an easement. In implementations, information corresponding to the easement may be represented by a digital asset on the system 120, such as the easement type (i.e., easement appurtenant or easement in gross) and the parties benefitting from the easement.

In embodiments, further information corresponding to a policy ID may be provided. Policy data attributes may include a policy type, a policy issuer, a policy number, a value, a date, one or more party names, a liability amount, a property ID or other property identification, a mortgage amount, a legal description of the property, a title description, exceptions, easements, encumbrances, or other identifying or descriptive information items. Such data attributes may be associated with a policy ID and may each have their own unique identifications. Certain data attributes may be required, while other may be optional. Required data attributes may correspond to accepted policy types such as, but not limited to, ALTA Ext Owner Policy, ALTA Std Owner Policy, ALTA Ext Loan Policy, ALTA Std Loan Policy. In embodiments, a policy ID may be associated with a digital image.

In embodiments, one or more third party service providers 110 may verify or facilitate the verification of information items. For example, the third party service providers 110 may compare a given address against the official USPS database and attempt to match the records between public address and an address corresponding to policy that may be stored or prepared to be stored or recorded on the system. If a match is found, the third party service provider 110 may correct or standardize the address, verify it, and return a valid address. If a match is not found, the third party service provider 110 may return a recommended address with an explanation or information pertaining to the mismatch. In embodiments, the recommended address may conform to a certain format or proscribe a limited set of information items, such as city, country, street, or a postal code. One or more known data verification services may be used. In embodiments, the data verification service may be an "oracle." An oracle may be described as a third party source of information provided to a distributed ledger or blockchain network.

System of record component 212 may be configured to store and/or access policy information. System of record component may comprise an information storage and retrieval system. System of record component 212 may be configured to issue policies or policy information to be recorded by the system. As illustrated, an agent of an insurance organization may be configured to store policy information onto a system of record that is integrated with the mutual indemnity blockchain system. In implementations, the insurance organization may access the system, or upload information from a system of record to the system, through insurance organization portal 226. In implementation, a policy or information corresponding or associated with a policy (such as a policy identification) may be delivered to one or more parties or users (i.e., a homeowner or a lender) by the system of record component 212.

In implementations, policy information may be recorded or published by the system. In implementations, the insurance organization may have an asymmetric-key PKI credential which it uses to digitally sign information that is published by the system. In implementations, the information may be organized based on one or more identifications as discussed herein.

In the mutual indemnification blockchain system 120, each participating organization may have a dedicated policy connector (e.g. policy connector component 214) for publishing policies onto the blockchain. In implementations, and as illustrated, a policy connector may be comprised of two components: Policy PDF Storage (e.g., an Azure Blob Storage for hosting contents of policies in PDF format); and a Policy Message Queue (e.g., an Azure Message Queue for queuing up Policy Messages). In embodiments, users and/or organizations can search these policies and view or download their content in PDF format from a User Interface web application.

In implementations, the content of policy documents may be in PDF format and may be uploaded to one or more databases, such as external database 220. In implementations, image component 213 may be used to receive and store images and/or publish information to a distributed ledger of system 120. In a specific implementation, the content of policy documents may be stored into a designated Azure Blob Storage via HTTPs. Users may be able to view and download content of Policy Documents from a User Interface web application (e.g., user portal 224). A policy image object may comprise a digital image, an image name, an image document ID (i.e., an ID associated with a system of record), an IPFS hash, or a file size. Such identification information may be used to create a unique ID for the image that may be digitally associated with a policy ID, one or more participants of the system, or any other identifiable information item.

In certain embodiments, policy messages may be in JSON data format. As an example, each message may contain a standardized property address, data of policies issued on this property, or references to uploaded policy documents (i.e., images stored in an external database 220). In a specific embodiment, policy messages may be published to a designated Azure Message Queue via HTTPs. Information contained in a policy message may further comprise a message ID, a tracking ID, a field ID, an action type, a property ID, and/or one or more, or an array of policy objects or policies, and/or a property address. In embodiments, the property address may be verified by a third party service provider 110 or determined to be unique (i.e., not a duplicate address) before being included and/or published in a policy message.

As illustrated, an import service (i.e., policy connector component 214) may be configured to receive policy images and policy messages. In certain implementations, an service (i.e., Azure Blob storage) may be used to temporarily store policy PDF files. In embodiments, information may be extracted from images using known optical character recognition. In implementations, information described herein as being collected by a participant (i.e., insurance organization 106) may be collected, standardized, reviewed, and published automatically. In implementations, the import service may upload images after the information it contains has been hashed and/or encrypted into an image service configured to store or otherwise make the images available to other participants. In implementations, images stored on one or more external databases may be referenced with a unique identification that is stored on a distributed ledger of system 120 so that images corresponding to issues policies may be reliably referenced and tracked. In implementations, the system may use an external database to permanently store policy image files. In embodiments, the database mechanism used to store images may be internal to the system 120.

In implementations, one or more participants of the system (i.e., users 104) may search or query policies that are stored by the system. In embodiments, a HYPERLEDGER Network may be used to record/query policies on the ledger. In embodiments, participants of the system may search or query policies with one or more portals as described herein (i.e., user portal 224). Policies may be searchable based on all the information they contain, as described herein. Image files corresponding to certain policies may be searched and/or accessed. In embodiments, the portal may provide a view and/or options to download an image. In some implementations, a link to the image file location may be provided. As illustrated, policies may be queried from the blockchain service and policy images may be retrieved from the image services through a user interface web app (i.e. user portal 224).

In implementations, image service may be a private IPFS that stores images that are hashed. The hashed value may be stored back on the blockchain with its associated metadata (i.e., information about the image and information about the policy to which it corresponds). In a certain implementation, the images and or corresponding information may be available to those participants with the requisite information. In embodiments, the hash value of an image may be the index key to the image itself in the IPFS, thus providing verification to participants that a given image corresponds to a given policy. In implementations, images may be policies or any other relevant documentation (i.e. schedule A and schedule B forms).

In certain implementations, the actual image of a policy may not be stored on a HYPERLEDGER FABRIC network. Instead, in such embodiments a hashed identifier to the IPFS implementation may be stored on HYPERLEDGER FABRIC network. In embodiments, policy data, including schedule A and schedule B data, may be stored on the HYPERLEDGER FABRIC network. Accordingly, in certain implementations, efficiency may be gained by using an external database to store image data because the blockchain network can be preserved for policy information verification.

Figure 6:
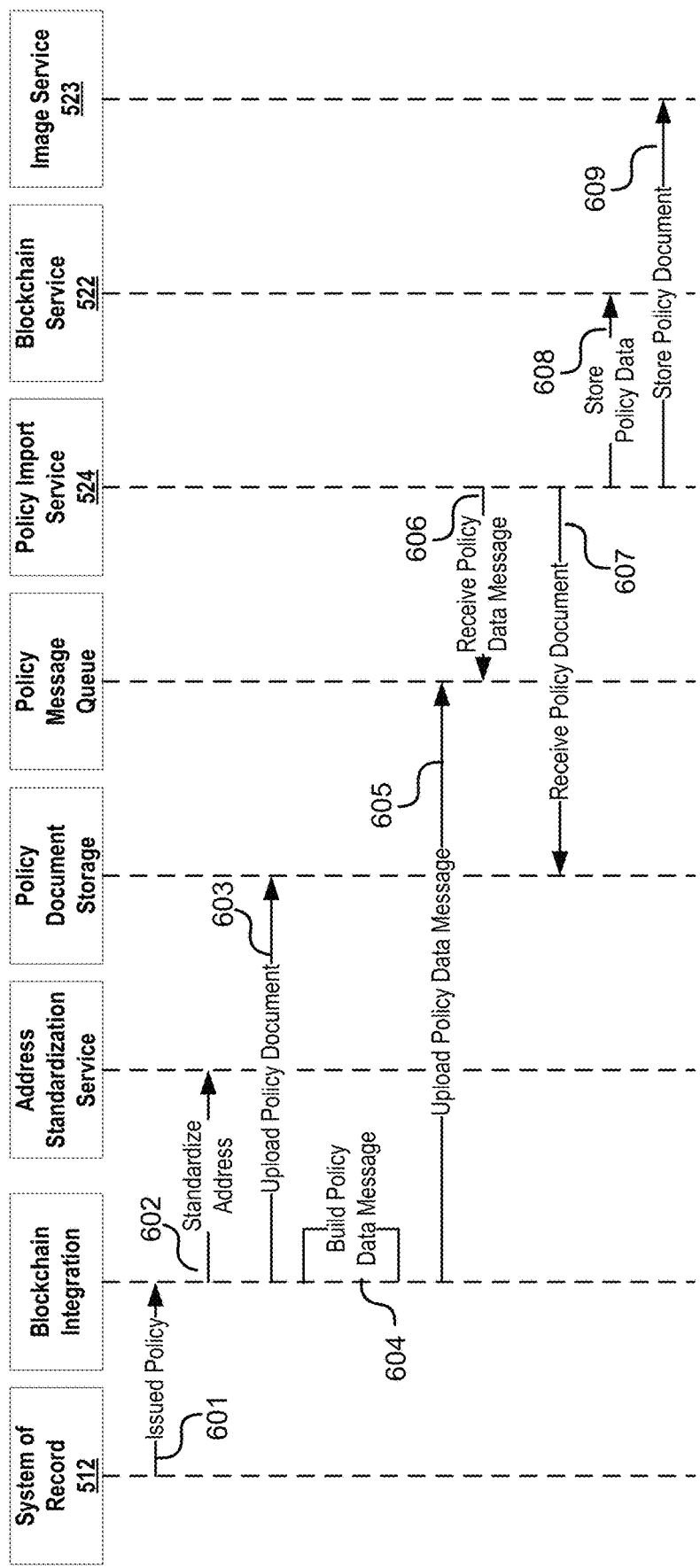
FIG. 6 illustrates a flow diagram of an embodiment of a mutual indemnity blockchain system, in accordance with the disclosure.

FIG. 6 illustrates an example flow diagram of a method performed by the blockchain system of FIG. 5, in accordance with implementations of the disclosure. As depicted, at step 601, an issued policy (e.g., starter) may be submitted by a system of record 512 corresponding to an organization 510. The system of record 512 may be configured to operate within a mutual indemnity blockchain system. The system of record 512 may comprise information corresponding to one or more title policies and one or more images associated with each of the policies. These policies may have been previously generated by the organization 510.

At step 602, information contained within the issued policy (e.g., certain fields of the document) is verified and/or standardized using a standardization service. In this example, a property address is verified and/or standardized using an address standardization service before being used to build a policy data message. By virtue of this step, any policy information that is subsequently stored in the distributed ledger may be consistently compared with other policy information stored in the distributed ledger. Moreover, this may facilitate a determination at policy import service 524 of whether there is conflicting policy information already stored on the distributed ledger. Furthermore, this standardization may ensure that a hashing algorithm applied to a string of certain fields of the policy document generates a consistent result. For example, by consistently generating the same hash for a standardized property address, policy information stored in the distributed ledger may enable efficient comparison of different policies (e.g., having unique document hashes) for the same property (e.g., having the same associated property hash).

At step 603, an image corresponding to the issued policy is uploaded to a policy document storage system. In implementations, the document may be stored in an image format (e.g., PDF) and may have associated metadata, as discussed herein. For example, information corresponding to the image file itself, the information it contains, an identification of the image, and/or an identification of a policy may be stored in association with the image.

At step 604, a policy data message is built based on data extracted from the issued policy stored on the system of record 512. For example, data corresponding to the issued policy may be extracted from the issued policy to create a policy data message that may be published to a policy message queue, as described herein. The policy data message may comprise information including, but not limited to, a standardized property address, data fields of the policy, and/or references to uploaded policy documents (i.e., images stored in an external database 220). In a specific embodiment, an Azure Message queue may be used to queue policy messages.

In implementations the policy data message contains a document hash uniquely identifying the document. One or more fields contained in the policy image may be hashed to generate a document hash representing a unique reference to the policy. For example, as discussed above, in particular implementations a SHA256 hash value (e.g., a policy ID) may be computed to identify a policy from a string in the following format: [Policy Kingdom]+[Transaction ID]+[Policy Document ID]. A string formed from the input ["Owner"]+[41865257]+[826821460] may
result in a unique hash value of 6C5B107803A5756B3DDB7CD766A9CA1494E 82E39746CD5C3F152FB7E41872B9E.

In implementations, the policy data message contains a property hash uniquely identify the property associated with the document. For example, as discussed above, a property ID may be created via a SHA256 hash value computed from a string in a certain format. The string may be formed from the address of the property or other identifying characteristics. As such, policies issued by one or more participants on the system may be associated with a property ID. Additionally, different policies issued for the same property may be associated with the same property ID, enabling easier comparison.

In implementations, the policy data message is digitally signed, using a private key associated with the organization 510. By virtue of the organization digitally signing the policy the message, the organization provides an endorsement of the information contained in the policy data message including the fields of the document, the document hash, and/or the property hash.

At step 606, a policy import service 524 (e.g., policy connector component 214) retrieves the policy data message. The policy import service may retrieve one or more information items associated with the stored policy document to be recorded onto a blockchain service (i.e., a distributed ledger contained within system 120).

At step 607, the policy import service 524 receives the policy document and causes the policy document itself (e.g., image file) to be stored by the image service (step 609). In embodiments, the image service comprises an off-chain storage (e.g., off-chain database) external to a blockchain network contained within system 120. In alternative implementations, the policy document may be stored on a blockchain network contained within system 120. In various embodiments, an identification (e.g., hash) of the image document may be recorded on the blockchain service (e.g., HYPERLEDGER FABRIC). By virtue of uploading the policy document to an off-chain storage system accessible by parties having access to policy data stored on the distributed ledger, data on the distributed ledger may be more efficiently managed by reducing the computing resource burden (e.g., memory resource burden) on the distributed ledger network. Moreover, the distributed ledger may store an identifier (e.g., document hash) of the policy document that may be used to query the off-chain system for the document image. In this manner, a client running a blockchain application for searching and viewing fields of policy records may also retrieve the underlying document image from which the data was retrieved. In some instances, the hash stored on the distributed ledger may also be used to confirm that the document image stored in the off-chain system corresponds to the policy information stored on the distributed ledger. For example, the same hashing function used to generate the hash stored on the distributed ledger may be applied to the policy image stored off-chain to verify its authenticity.

The import service (i.e., policy connector component 214) is used to process policy data received in messages from the policy message queue. For example, at step 608, it causes data contained in the policy message to be stored in the distributed ledger. In some implementations, information corresponding to each received policy may be analyzed and verified to determine whether or not they contain the necessary information or if the policy exists elsewhere on the network (e.g., as determined by reviewing the submitted document hash), as discussed herein. In such cases, only data of unique and verified policies may be imported and stored onto the blockchain service of the system 120.

Figure 7:
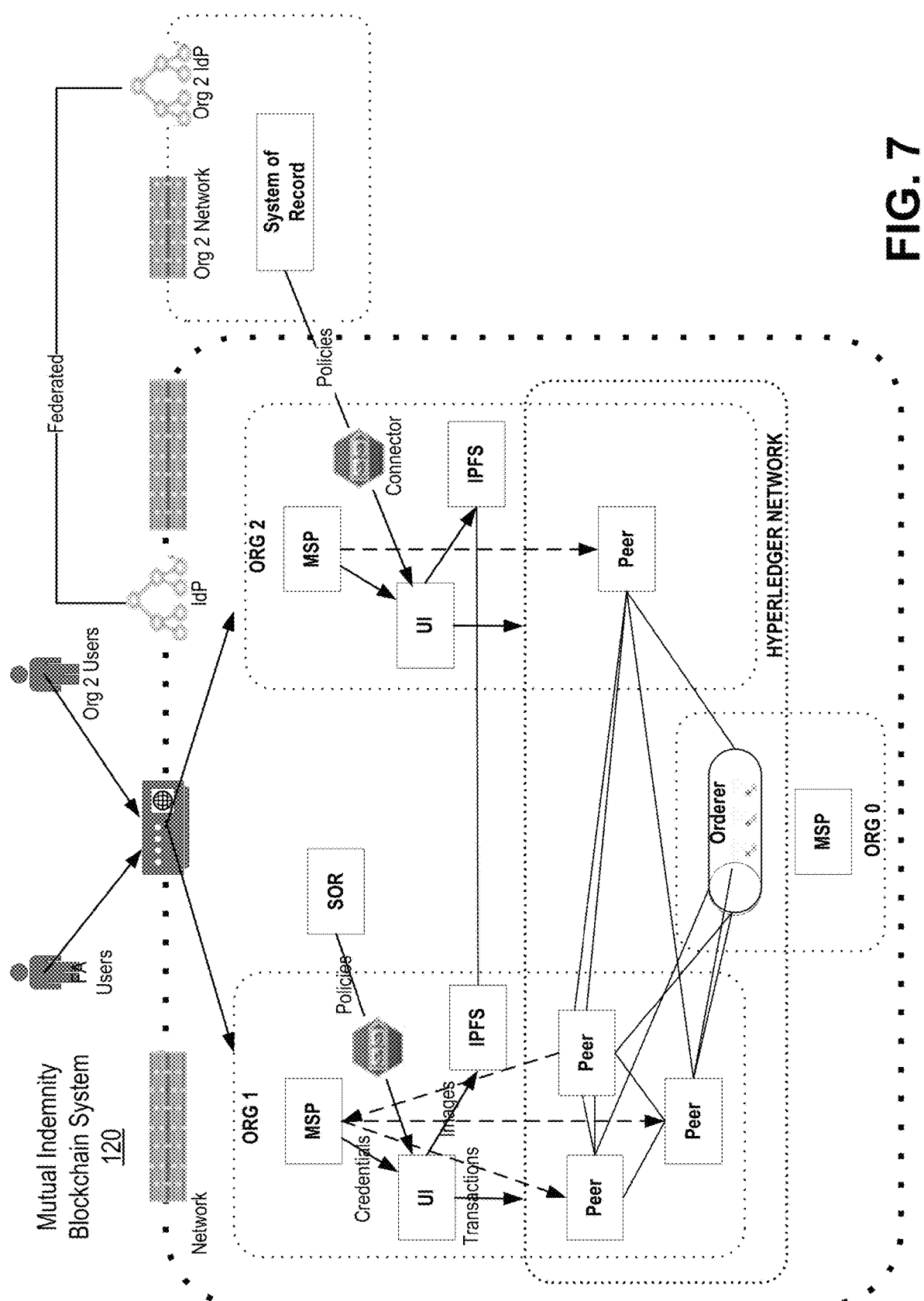
FIG. 7 illustrates an embodiment of a mutual indemnity blockchain system, in accordance with the disclosure.

FIG. 7 illustrates a specific embodiment of the system 120 implementing a HYPERLEDGER FABRIC framework. In this embodiment, at least two users (i.e., users 104 or insurance organizations 106) may access the network as described herein. In implementations, one or more insurance organizations may operate, or facilitate the operation of, one or more nodes that process, propose, validate, or order transactions on the HYPERLEDGER FABRIC network. As one of ordinary skill in the art would appreciate, it may not necessary be necessary for a participant to operate a node on the network in order to access it.

As illustrated, a second organization may access the network of system 120 via an external network comprising a separate system of record. In such embodiments, the systems of record for the one or more organizations may be configured to publish policy information to a distributed ledger contained with the system 120. In the shown embodiment, organizations may publish policy information by authorizing the publication with a private key, as described herein. As explained herein, systems of record may interact with the network through a policy connector component. In implementations, the policy connector component may comprise an application programming interface (API) for publishing policy information or image data to one or more storage devices within system 120. As illustrated in the shown embodiment, one or more participants may interact with the system through a user interface (i.e., portals 224, 226, 228, and 230).

In implementations policy information and/or image data corresponding to one or more policies may be stored by a peer-to-peer distributed file storage system such as the Inter Planetary File System (IPFS) (i.e., external database 220). An external database may also be a database that is not outside of system 120, but at least in some respect separate from the database mechanism used to record policy information data.

As shown herein, transactions related to published policies may be recorded in a peer-to peer, distributed ledger network. In embodiments, HYPERLEDGER FABRIC may be used as a network to record policy transactions. As one of ordinary skill in the art would understand, many other implementations of the present systems using distributed ledger technology are possible, including implementations not utilizing HYPERLEDGER FABRIC.

Figure 8:
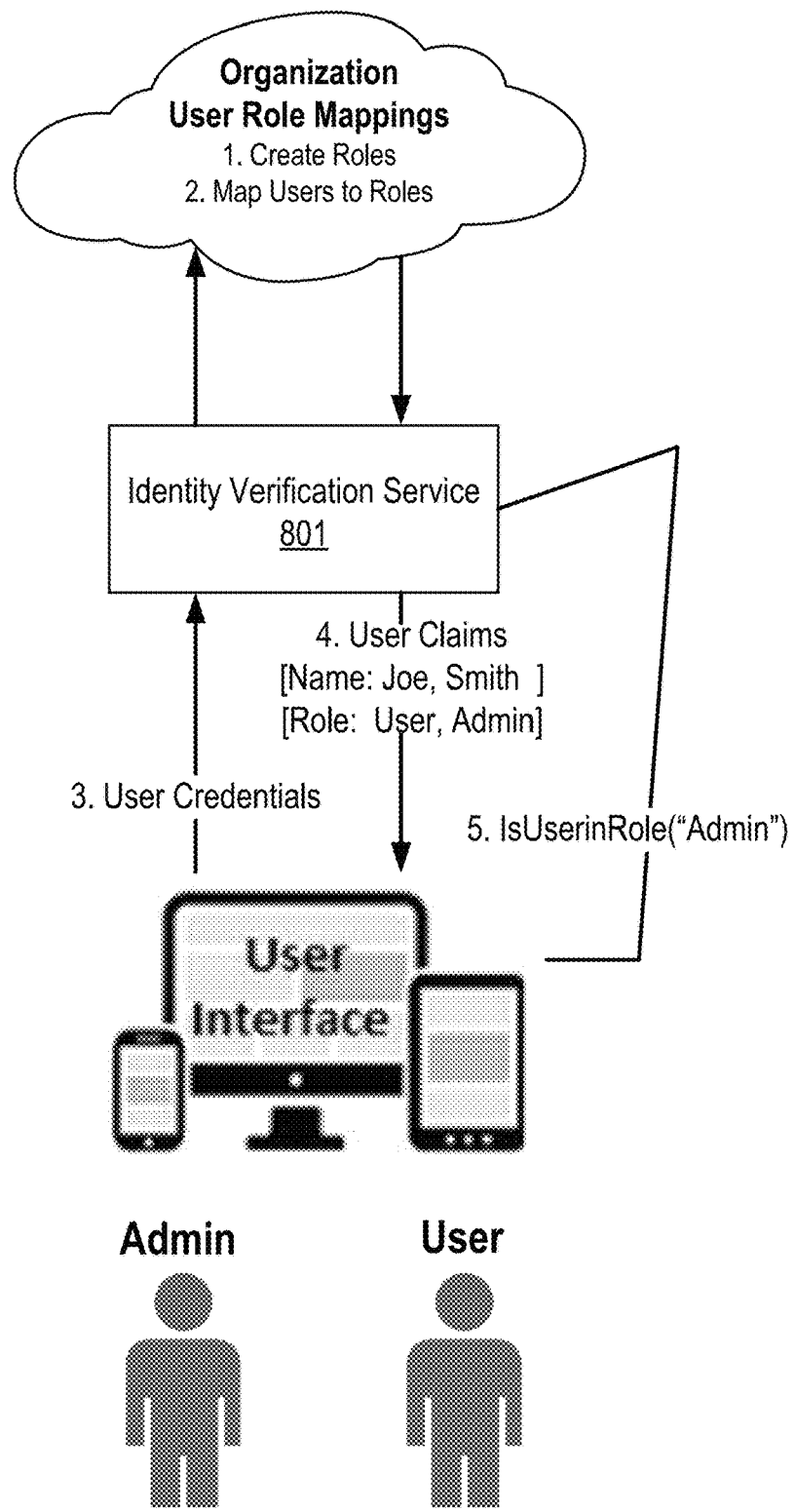
FIG. 8 illustrates a process for accessing a mutual indemnity blockchain system, in accordance with the disclosure.

FIG. 8 illustrates a process for user authentication in implementations of system 120. In implementations, user authentication may be performed by an organization's identity provider. In some implementations, an identity verification service 801 may be implemented for organizations to verify their identity and authorization on the system. In some implementations, OpenID protocol may be implemented as the identity verification service. In embodiments, user authorization may be governed by a role-based security protocol. User roles may be assigned through a security group in the organization's identity provider.

The permissions of the participants may depend on their identity as verified through an identity verification service. In some implementations, PKI credentials may be generated by the participant. In implementations, a credential may be generated directly (via a root or mesh trust) or through an industry bridge certification authority. In implementations, the permissions of a participant within the system 120 may depend on their verified identities. In implementations, certain actions performed on the network may require a private key authentication from identified individual participant or a participant of a certain type (i.e., banker, lender, administrator, insurance organization). For example, in certain implementations, certain users may be authorized to read transaction information corresponding to issued policies. A user, like a homeowner, may have an interest in understanding a title policy corresponding to a parcel of real property. However, such a user may not have authorization to write transactions. In comparison, in some embodiments, insurance organizations may have the exclusive authorization to upload policy information. In certain implementations, the Policy Document Storage and Policy Message Queue may accessed by Shared Access Signature (SAS) over HTTPs.

In certain embodiments, participants may be configured to access the system 120 via a digital interface for that user. In various implementations, multifactor authentication may be utilized to authenticate the identity of the user attempting to access a digital wallet. In some implementations, a component the same as or similar to authentication component may be configured to manage one or more authentication factors. The one or more authentication factors may include provision of a PIN, SMS verification, QR code authentication, fingerprint analysis, and/or one or more other authentication factors. Thus the embodiment of the permissioned blockchain disclosed herein permits users to interact with one another and access information contained with the system in a way that guarantee that actions performed are authorized, known actors.

Figure 9:
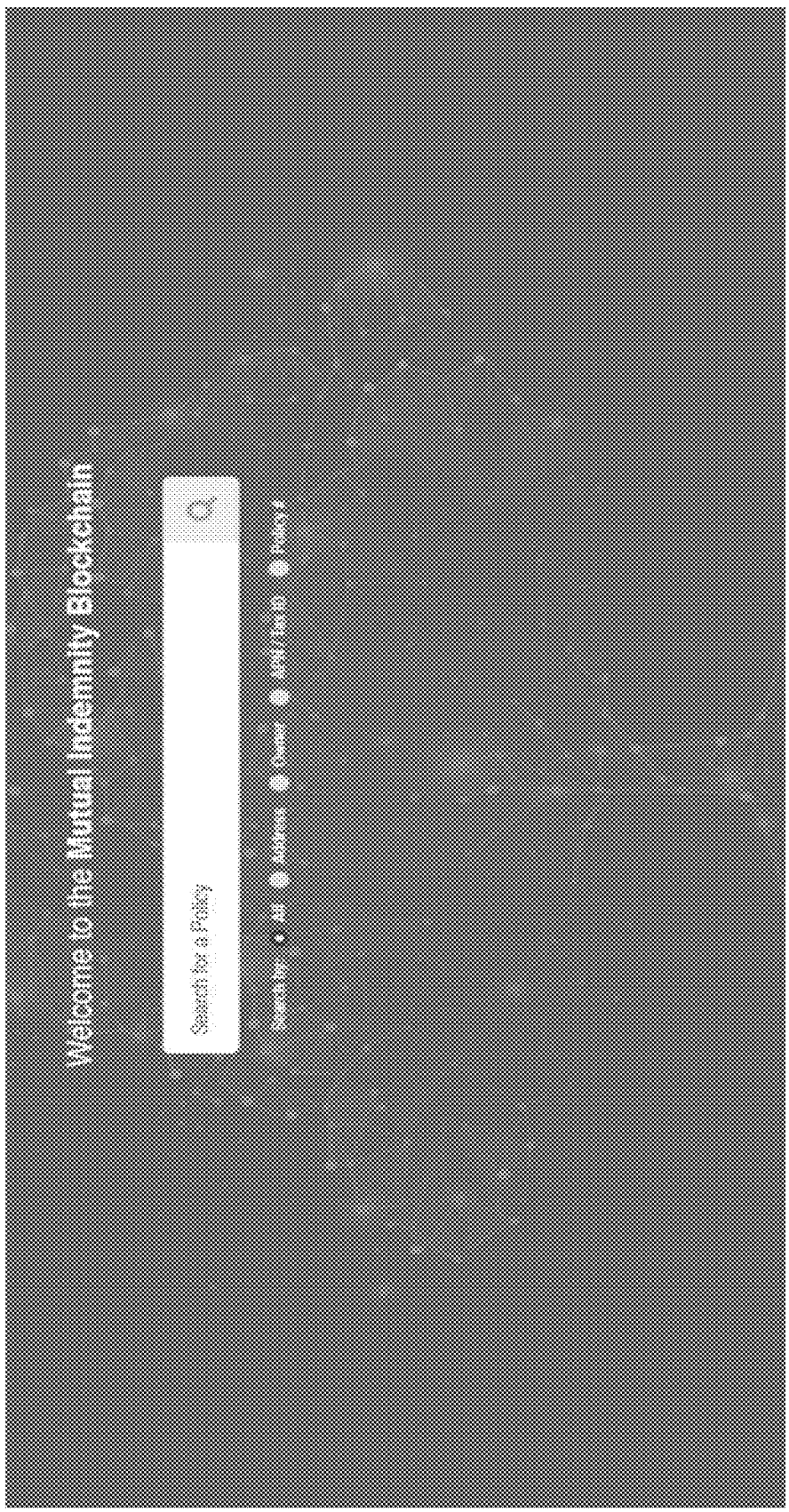
FIG. 9 illustrates an embodiment of a search query for a mutual indemnity blockchain system, in accordance with the disclosure.

FIG. 9 illustrates a display and graphical user interface of a device in accordance with the embodiments disclosed herein. As described herein, and shown in FIG. 5, participants may search for policies that are recorded by the system, as described herein. Participants (i.e., users, insurance organizations, etc) may access a searchable database of policy information through one or more portals (i.e., portals 224, 226, 228, 230) comprising a user interface, a display, or a graphical user interface. Shown in FIG. 9 is an embodiment of a search query shown on user interface. In implementations, a web based user interface may be employed to query policies through the system. In implementations, images stored in associated with one or more policies may be queried.

For example, as shown in FIG. 9 a query may be provided for searching for a policy contained within the mutual indemnity blockchain system 120. In implementations, a user may type in a search manually. In embodiments, a user may type in any identification information relating to a policy including, but not limited to, an address, an owner, an APN or Tax ID, or a policy number.

Figure 10:
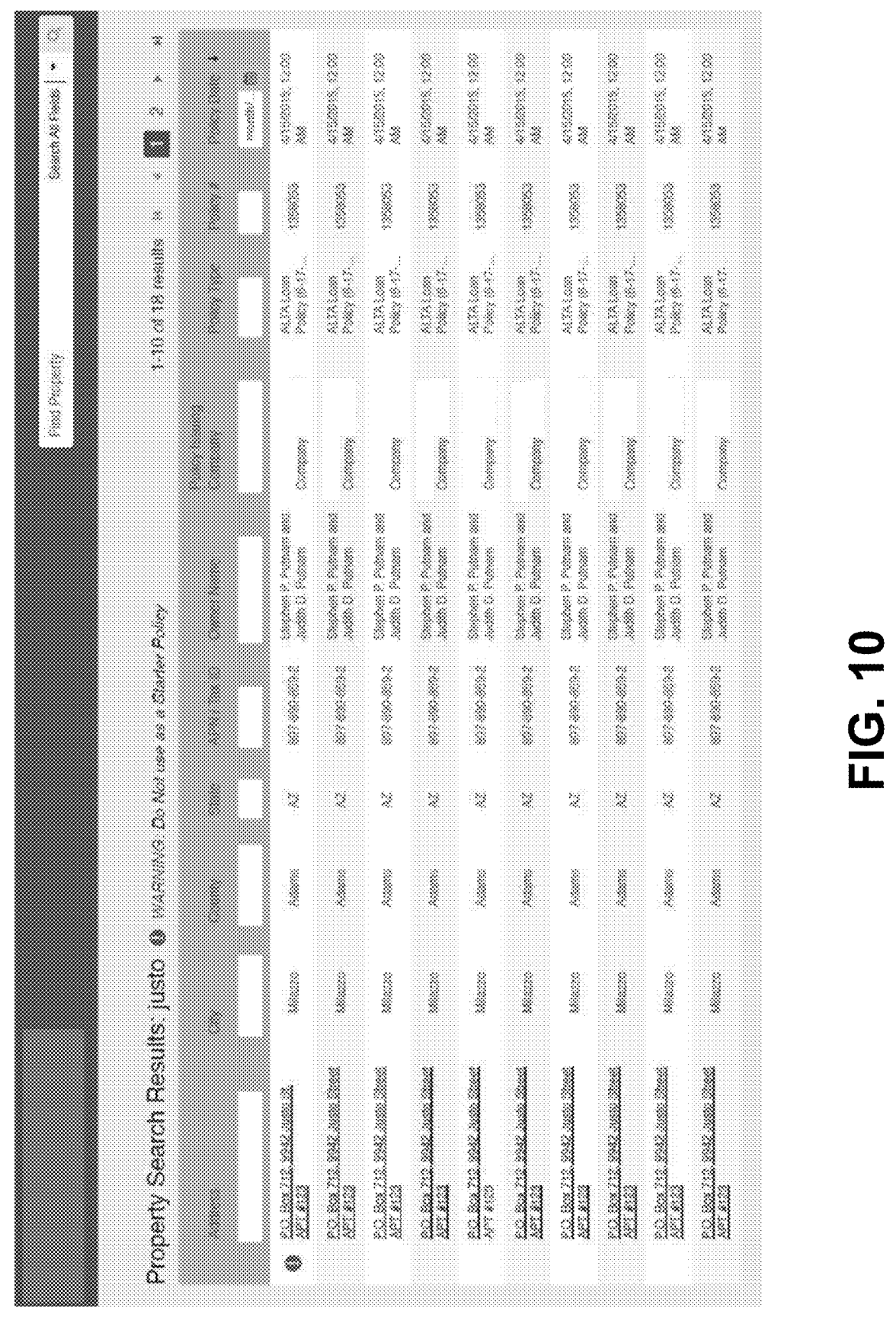

As shown in FIG. 10, a user has queried the search term "justo" resulting in several addresses associated other identification information such as, an owner, a policy issuing company, a policy type, a policy type, and a policy date. As described herein, one or more information items illustrated in FIG. 10 may correspond to an issued title policy that has been recorded on a distributed ledger. Thus, each unique parcel associated with the address as shown in FIG. 10 may be associated with a unique identification recorded by the system.

In accordance with the embodiments disclosed herein, various users may be authorized to provide feedback to the system regarding the accuracy of information associated with title policies. In some embodiments, a policy made not have correct information or the information has not updated. In embodiments, there may be a visual indication as to the suspected invalidity or inaccuracy of a policy. As illustrated in FIG. 10, a red exclamation point warning may indicate to a user not to rely upon the policy. In embodiments, one or more of the individual information items may be selected.

FIG. 11 illustrates policy information associated with a specific address displayed on a graphical user interface of a user display. As disclosed herein, policy information may be associated with one or more identifiable addresses. In certain implementations, a timeline view across multiple policies may be provided. The timeline view may comprise one or more representations of policies associated with one or more users. In a certain embodiments, the policies may be associated with an owner (i.e., an owner's policy) or a lender (i.e., a loan policy). In embodiments, the representations of the individual policies may be graphically associated with the parties to which the policies are associated. In the embodiment shown in FIG. 11, the timeline view provides a chronological representation of policies issued over time (e.g., a timeline) to owners and/or lenders for a specific property of interest that was searched for. The representations of individual policies at a given time may be selected so that their underlying information may be presented by the display to a user. In embodiments, a status of the policy may be represented in the timeline view (i.e., flagged policies may appear red as depicted in FIG. 11).

In implementations, a user can navigate through different policies by selecting the representations of policies. As shown, information associated with a selected policy will populate in display. In this fashion, repeated searching for policies pertaining to a parcel of property are not required as all of the policies recognized by the system as being associated with the parcel are shown on a single page. In certain implementations, a hover-over feature may be implemented to display information allowing the user to explore when two policies are too close in time to be rendered separately on the timeline. In certain implementations, there may be representations of an option for an administrative user to view, edit, or organize policies whose information is suspected to be, or actually inaccurate, incomplete, unverified, or invalid.

Figure 12:
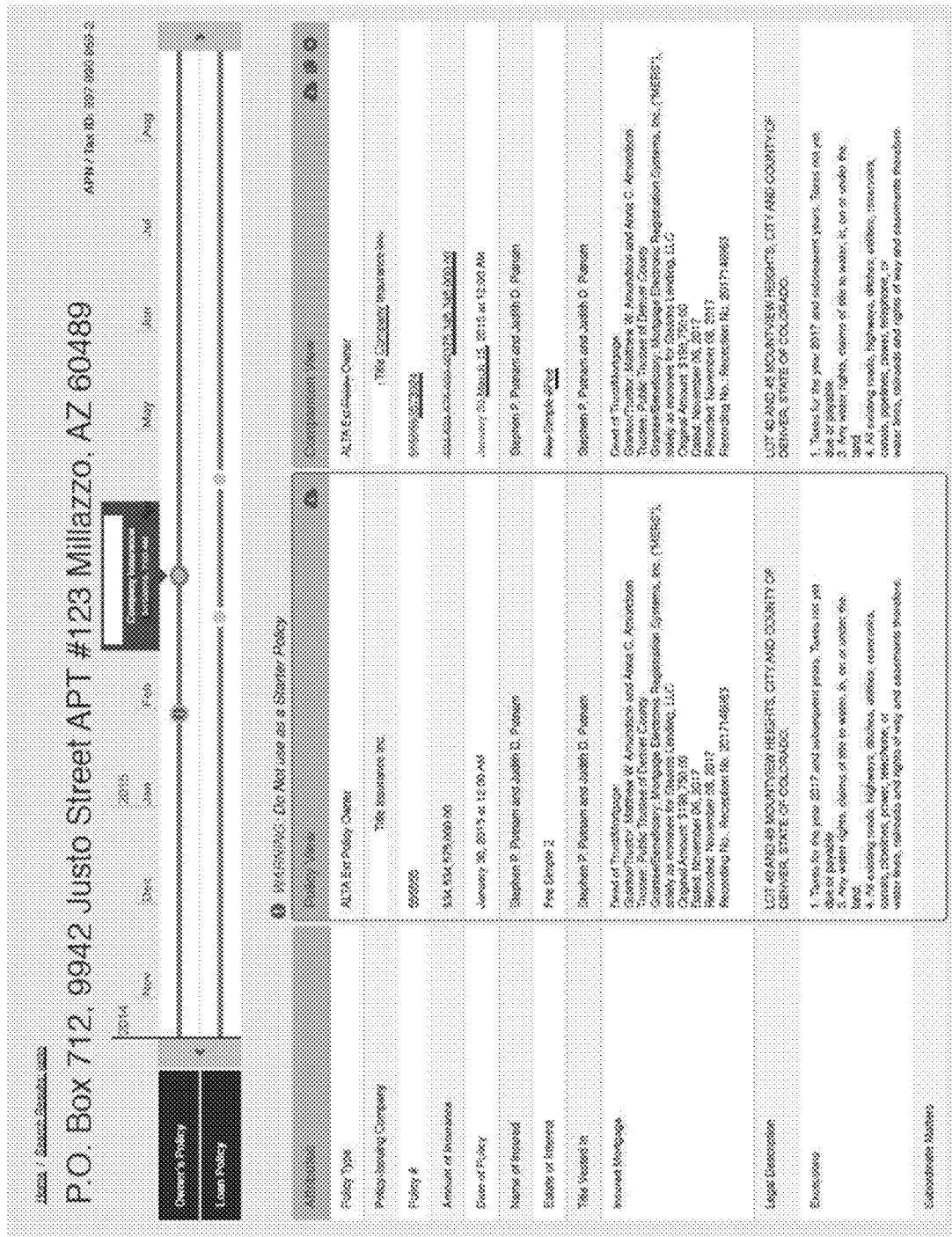
FIG. 12 illustrates an embodiment of a comparison mode, in accordance with the disclosure.

FIG. 12 illustrates a comparison view of two policies selected in the timeline view. In embodiments, the system may provide a redline comparison illustrating the differences between one or more policies. By virtue of such implementations, the inefficient "stare and compare" operation required under conventional practice may be eliminated, vastly increasing the speed and accuracy of such comparisons. Under conventional practice, the tedious nature of the manual comparison meant that such a comparison was not always performed with the frequency, accuracy, and completeness desired. In accordance with embodiments disclosed herein, the system provides a way to perform a comparison in a more comprehensive manner providing more consistency and quality to policies issued going forward. In this particular embodiment, the information associated with policies being compared relate to an owner's policy for the same parcel of land. In some implementations, a redline comparison may indicate an inaccuracy in a policy. In implementations, a redline comparison may indicate that a policy is not completed up to date. As described herein, the policy information illustrated in FIG. 12 may be provided through a policy update message that has been prepared by an organization. Accordingly, the quality of the information may be much higher than if simply scanned off of a PDF itself because data may be directly obtained from one or more systems of record associated with one or more organizations.

In implementations, a user may have different permissions and accessible features on the graphical user interface based on their identity and corresponding permissions. For example, an administrative user may be configured to review changes, corrections, or differences between one or more to policies. Additionally, an administrative user may be configured to view rejected or duplicate policies that are not recorded by the system due to their deficiencies. For example, a user may be configured to confirm that one more properties are associated with a given policy. In certain embodiments, a user may be configured to select a an address from one or more recommended addresses that may correspond to an address associated with a policy. Such implementations provide users with an opportunity to provide data recognizable by the system (i.e., standardized data formats) so that each of the network participants may benefit from uniformly published data corresponding to issued policies. In certain embodiments, an administrative user may review one or more policies to determine whether a policy is a correction to an existing policy or a duplicate of an existing policy. In certain embodiments, and as shown in FIG. 12, an administrative user may be able to see differences between two policies using a redline feature, to help determine whether to accept or reject a change to an existing policy. In certain embodiments, a user may submit feedback to the system through one or more portals as described herein indicating one or more of the completeness, accuracy, validity, or reliability of the policy information. As described herein, such feedback may provide useful as input or evidence to one or mutual indemnity agreements between one or more participants of the system. The present system is designed to ensure reliability and validity of title policy information through consensus from one or more network participants who publish such information.

The present disclosure relates to a permissioned ledger that may be written to and/or accessed by permissioned parties for the purpose of sharing title policy information. As described herein, one or more organizations (i.e., insurance organizations 106) may publish information corresponding to policies that may be relied on other participants. One or more participants may create indemnification agreements between one or more other participants to indemnify participants who rely on false information. For example, if information published by a first participant is incorrect and relied on by a second participant to the second participant's detriment, the first participant may agree to indemnify the second participant. In this way, a participant who publishes policy information may agree to one or more other participants that the information is correct. Because publication to the ledger may require an authenticated user, the quality of information published by specific participants may be observed and analyzed. In some embodiments, agreement to a mutual indemnification agreement may be a pre-requisite to publishing information on the system.

In some implementations, a mutual indemnification agreement may be represented by code configured to run on a virtual machine operating on the system (i.e., a smart contract). A mutual indemnification agreement may be represented through conditional logic and computer code. In implementations, one or more information items and participants may be associated with one or more smart contracts. In embodiments, a smart contract may be configured to detect when the indemnification provisions of the smart contract are initiated. For example, feedback received from one or more users relating to the accuracy of an information item may inform whether the party who published the information item has an obligation to indemnify another participant.

Figure 13:
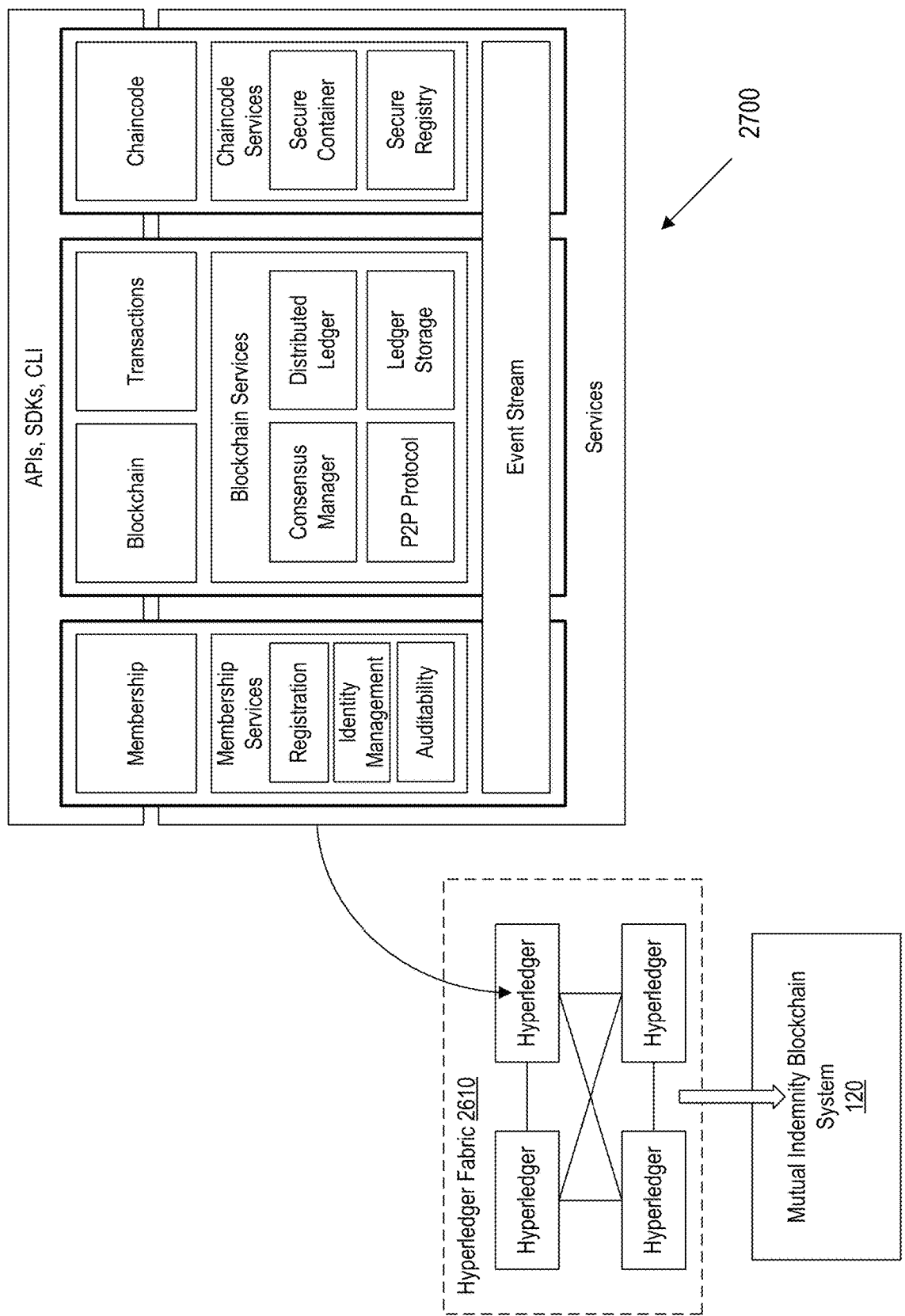
FIG. 13 illustrates an embodiment of a HYPERLEDGER FABRIC, in accordance with disclosure.

FIG. 13 illustrates a block diagram of an example of a HYPERLEDGER FABRIC architecture 2700 used to implement the mutual indemnity blockchain system described herein, in accordance with one or more implementations of the disclosure. Depending on the needs of a mutual indemnity blockchain system, one or more servers used to implement the system may be configured to perform blockchain services, membership services, and/or chaincode services.

Servers used to implement blockchain services may include a consensus manager component, a distributed ledger, a peer to peer protocol component, ledger storage, and/or one or more other components. In various implementations, the consensus manager component may be configured to manage a consensus algorithm/protocol, obtain one or more transactions from the HYPERLEDGER network, and execute the one or more transactions according to consensus algorithm/protocol chosen. In various implementations, the distributed ledger may comprise a database used by one or more smart contracts to store information during transaction execution. Each transaction may comprise a smart contract (or chaincode) that, when executed, may cause a global state of a distributed ledger to be updated. Servers used to implement membership services may include a user registration component, a user identity validation component, and an auditability component. In various implementations, user registration component may register users with the system as described herein. A public key infrastructure may be used to support authorization and identify management operations. Servers used to implement chaincode services may be configured to execute smart contracts (or chaincodes) within a secure container and may contain two components—a secure container and a secure registry.

The mutual indemnity blockchain system described herein may be administered via one or more different hardware implementations. For example, an administrator (or administrative user) may be able to customize the hardware and/or other technology managed by, and/or maintained at a location associated with, the administrator. In some implementations, one or more hardware components described herein may be managed by, and/or maintained at a location associated with, an administrator, and one or more other hardware components described herein may be managed by, and/or maintained at a location associated with, one or more third parties. In some implementations, one or more features of the mutual indemnity blockchain system described herein (e.g., mutual indemnity blockchain system 120) may be performed by an administrator (or one or more administrative users), and one or more other features of the mutual indemnity blockchain system may be performed by one or more third parties. In various implementations, mutual indemnity blockchain system 120 may be configured to store computer program instructions which, when executed by one or more processors, configures one or more hardware components of the mutual indemnity blockchain system managed by, and/or maintained at a location associated with, an administrator to perform one or more features described herein and interface with one or more hardware components managed by, and/or maintained at a location associated with one or more third parties.

It should be noted that although various embodiments are described herein with respect to real estate-related documents, and particularly title policies, one having ordinary skill in the art reading this description would fully appreciate and understand that the various embodiments could be used with documents from other fields and industries not pertaining to real estate or title examination.

In general, the word "component," "component," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

The reference to a blockchain, or blockchain technology, included herein is by way of example. Other distributed ledgers and/or databases may be used. Blockchains may be permissioned or permissionless. Permissioned access provides a greater ability to control who has access to various data. A combination of permissioned and permissionless blockchains may be used. Various other access control mechanisms may also be used.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. For example, the use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The language used herein has been principally selected for readability and instructional purposes, and it may not have been selected to delineate or circumscribe the inventive subject matter. Other implementations, uses, and advantages of the disclosure will be apparent to those skilled in the art from consideration of the specification and practice of the disclosure disclosed herein. The specification should be considered exemplary only, and the scope of the disclosure is accordingly intended to be limited the claims.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A non-transitory computer-readable medium having instructions stored thereon that, when executed by a processor, causes a system associated with a title organization to perform operations comprising:
    retrieving a title policy from a system of record;
    uploading the title policy for storage in an off-chain system accessible by a plurality of entities having access to a distributed ledger of a distributed ledger network, the plurality of entities comprising the title organization;
    hashing one or more fields contained in the title policy to generate a first hash representing a unique reference to the title policy by:
        forming a string from one or more of a transaction ID, a local policy document ID, and a policy type identifier, and
        generating the first hash from the string;
    generating a message comprising a plurality of fields contained in the title policy and the first hash;
    digitally signing, using a private key associated with the title organization, the message to endorse the first hash and the plurality of fields contained in the title policy; and
    after digitally signing the message, transmitting the message to the distributed ledger network to store the first hash and the plurality of fields in the distributed ledger.

2. The non-transitory computer-readable medium of claim 1, wherein:
    the title policy comprises a real property address,
    the message comprises the real property address, and
    the operations further comprise: before generating the message, standardizing the real property address.

3. The non-transitory computer-readable medium of claim 2, wherein the operations further comprise:
    after standardizing the real property address, combining one or more components of the real property address into a string; and
    hashing the string to generate a second hash representing a unique reference to a real property corresponding to the real property address, wherein the message comprises the second hash.

4. The non-transitory computer-readable medium of claim 1, wherein the operations further comprise storing the title policy in the system of record.

5. The non-transitory computer-readable medium of claim 4, wherein:
    transmitting the message to the distributed ledger network, comprises publishing the message to a policy message queue, and
    after the message is published, a determination is made whether the first hash has been previously recorded on the distributed ledger.

6. The non-transitory computer-readable medium of claim 5, wherein if the first hash has been previously recorded on the distributed ledger, the first hash and the plurality of fields of the message are not stored in the distributed ledger.

7. The non-transitory computer-readable medium of claim 1, wherein the distributed ledger is a permissioned distributed ledger accessible by the plurality of entities.

8. The non-transitory computer-readable medium of claim 1, wherein the operations further comprise: running a distributed ledger application for accessing and viewing a plurality of title policy records stored on the distributed ledger, the plurality of title policy records including the first hash and the plurality of fields.

9. The non-transitory computer-readable medium of claim 8, wherein the operations further comprise:
   initiating, at the distributed ledger application, a search query comprising a reference to a real property; and
   based on the search query, accessing a title policy record associated with the real property.

10. The non-transitory computer-readable medium of claim 9, wherein the operations further comprise: presenting a selectable link including an off-chain location of a document image file associated with the title policy record.

11. A method, comprising:
   retrieving, using a device associated with a title organization, a title policy from a system of record;
   uploading, using the device, the title policy for storage in an off-chain system accessible by a plurality of entities having access to a distributed ledger of a distributed ledger network, the plurality of entities comprising the title organization;
   hashing, using the device, one or more fields contained in the title policy to generate a first hash representing a unique reference to the title policy by:
      forming a string from one or more of a transaction ID, a local policy document ID, and a policy type identifier, and
      generating the first hash from the string;
   generating, using the device, a message comprising a plurality of fields contained in the title policy and the first hash;
   digitally signing, by the device, using a private key associated with the title organization, the message to endorse the first hash and the plurality of fields contained in the title policy; and
   after digitally signing the message, transmitting, by the device, the message to the distributed ledger network to store the first hash and the plurality of fields in the distributed ledger.

12. The method of claim 11, wherein:
   the title policy comprises a real property address,
   the message comprises the real property address, and
   the method further comprises: before generating the message, standardizing the real property address.

13. The method of claim 12, further comprising:
   after standardizing the real property address, combining one or more components of the real property address into a string; and
   hashing the string to generate a second hash representing a unique reference to a real property corresponding to the property address, wherein the message comprises the second hash.

14. The method of claim 11, further comprising: storing the title policy in the system of record.

15. The method of claim 14, wherein:
   transmitting the message to the distributed ledger network, comprises publishing the message to a policy message queue, and
   after the message is published, a determination is made whether the first hash has been previously recorded on the distributed ledger.

16. The method of claim 15, wherein if the first hash has been previously recorded on the distributed ledger, the first hash and the plurality of fields of the message are not stored in the distributed ledger.

17. The method of claim 11, wherein the distributed ledger is a permissioned distributed ledger accessible by the plurality of entities.

18. The method of claim 11, further comprising: running, using the device, a distributed ledger application for accessing and viewing a plurality of title policy records stored on the distributed ledger, the plurality of title policy records including the first hash and the plurality of fields.

* * * * *